US008944326B2

(12) United States Patent
Bolton et al.

(10) Patent No.: US 8,944,326 B2
(45) Date of Patent: Feb. 3, 2015

(54) SYSTEM AND METHOD FOR MONITORING PRECINCT-BASED BALLOT TABULATION DEVICES

(71) Applicant: Election Systems & Software, LLC, Omaha, NE (US)

(72) Inventors: Steve Bolton, Clearwater, FL (US); Kenneth Carbullido, Omaha, NE (US)

(73) Assignee: Electron Systems & Software, LLC, Omaha, NE (US)

( * ) Notice: Subject to any disclaimer, the term of this patent is extended or adjusted under 35 U.S.C. 154(b) by 0 days.

(21) Appl. No.: 14/142,237

(22) Filed: Dec. 27, 2013

(65) Prior Publication Data

US 2014/0263638 A1 Sep. 18, 2014

Related U.S. Application Data

(60) Provisional application No. 61/789,410, filed on Mar. 15, 2013.

(51) Int. Cl.
*G06K 17/00* (2006.01)
*G07C 13/00* (2006.01)
*G07C 13/02* (2006.01)

(52) U.S. Cl.
CPC .................................... *G07C 13/02* (2013.01)
USPC .......................................................... 235/386

(58) Field of Classification Search
USPC ...... 235/51, 50 R, 50 B, 52, 56, 386; 705/12; 434/306
See application file for complete search history.

(56) References Cited

U.S. PATENT DOCUMENTS 4,641,240 A * 2/1987 Boram ............................ 705/12
5,612,871 A 3/1997 Skogmo
6,240,393 B1 5/2001 Brown
6,607,137 B2 8/2003 Morales
6,854,644 B1 2/2005 Bolton et al.
7,387,244 B2 * 6/2008 Bolton et al. ................. 235/386
7,422,150 B2 9/2008 Chung
7,431,209 B2 10/2008 Chung
7,614,553 B2 11/2009 Chung et al.
7,654,457 B2 2/2010 Wilson et al.
7,828,215 B2 11/2010 Chung et al.

(Continued)

OTHER PUBLICATIONS

*Alternative Ballot Techniques*, Hearing before the Subcommittee on Elections, Second Session, Washington DC, Sep. 22, 1994.

(Continued)

*Primary Examiner* — Michael G Lee
*Assistant Examiner* — Suezu Ellis
(74) *Attorney, Agent, or Firm* — Stinson Leonard Street LLP

(57) ABSTRACT

A system for remotely monitoring a plurality of ballot tabulation devices is provided. The ballot tabulation devices are located at a plurality of polling locations, each of which is operable to process a plurality of marked paper ballots and maintain health status information for the device. The system includes a central server located remotely from the ballot tabulation devices that is operable to periodically receive the health status information for each device and generate an alert that identifies any irregularities associated with each device based on the received health status information. Preferably, the health status information is encoded in a machine-readable code that is displayed on a display screen of the ballot tabulation device, and a reading device is used to read the machine-readable code from the display screen and transmit the health status information to the central server.

10 Claims, 12 Drawing Sheets

(56) References Cited

U.S. PATENT DOCUMENTS

| | | | | |
|---|---|---|---|---|
| 7,839,289 | B2 | 11/2010 | Chung et al. | |
| 7,988,047 | B2 | 8/2011 | Chung et al. | |
| 8,033,463 | B2 | 10/2011 | Felten et al. | |
| 8,096,471 | B2 | 1/2012 | Cummings et al. | |
| 8,136,729 | B2 | 3/2012 | Bolton | |
| 8,174,383 | B1 | 5/2012 | Chung et al. | |
| 8,191,764 | B2 | 6/2012 | Bolton | |
| 8,225,998 | B2 | 7/2012 | Bolton | |
| 2001/0035455 | A1* | 11/2001 | Davis et al. | 235/375 |
| 2001/0042005 | A1* | 11/2001 | McClure et al. | 705/12 |
| 2004/0059628 | A1 | 3/2004 | Parker et al. | |
| 2004/0078261 | A1* | 4/2004 | Eustis | 705/12 |
| 2004/0155108 | A1* | 8/2004 | Saito | 235/386 |
| 2004/0169077 | A1* | 9/2004 | Petersen et al. | 235/386 |
| 2005/0211778 | A1* | 9/2005 | Biddulph | 235/386 |
| 2007/0235535 | A1 | 10/2007 | Davoust et al. | |
| 2007/0267493 | A1* | 11/2007 | Coutts | 235/386 |
| 2008/0087728 | A1 | 4/2008 | Theisen | |
| 2008/0116270 | A1 | 5/2008 | Wilson et al. | |
| 2008/0308634 | A1* | 12/2008 | Bolton et al. | 235/386 |
| 2009/0037260 | A1 | 2/2009 | Felten et al. | |
| 2009/0076891 | A1* | 3/2009 | Cardone et al. | 705/12 |
| 2009/0256703 | A1 | 10/2009 | Bolton | |
| 2010/0114674 | A1 | 5/2010 | Daza Fernandez et al. | |
| 2010/0164710 | A1 | 7/2010 | Chung et al. | |
| 2010/0225653 | A1* | 9/2010 | Sao et al. | 345/520 |
| 2010/0230491 | A1* | 9/2010 | Bolton | 235/386 |
| 2011/0153388 | A1 | 6/2011 | Vuong et al. | |
| 2012/0048930 | A1* | 3/2012 | Arnao et al. | 235/386 |
| 2012/0061468 | A1* | 3/2012 | Arnao et al. | 235/386 |
| 2012/0187188 | A1 | 7/2012 | Schmidt et al. | |
| 2012/0239464 | A1 | 9/2012 | Vicari | |
| 2013/0071029 | A1* | 3/2013 | Terwilliger et al. | 382/183 |
| 2013/0166969 | A1* | 6/2013 | Zhang et al. | 714/57 |
| 2013/0301873 | A1* | 11/2013 | Hoover et al. | 382/103 |
| 2013/0346164 | A1 | 12/2013 | Ramamurti | |

OTHER PUBLICATIONS

Alvarez et al., *Voting What Is What Could Be*, Report by Caltech/MIT Voting Technology Project, Jul. 2001 (96 pgs).

Stanford University, *Resolution on electronic voting*, http://verify.standord.edu/evote.html, Apr. 2, 2003.

Web Page, *Avante Products*, (http://www.aitechnology.com/avantetech/home.html) Nov. 28, 2005.

*Voluntary Voting System Guidelines*, adopted by the Election Assistance Commission (EAC) on Dec. 13, 2005 (vol. I and II) (190 pgs).

Mercuri, Rebecca, *Electronic Vote Tabulation Checks & Balances*, Dissertation presented to the University of Pennsylvania, Nov. 13, 2000 (238 pgs).

Hart Intercivic, Inc., *eScan precinct digital ballot imaging*, 2006 (2 pgs).

* cited by examiner

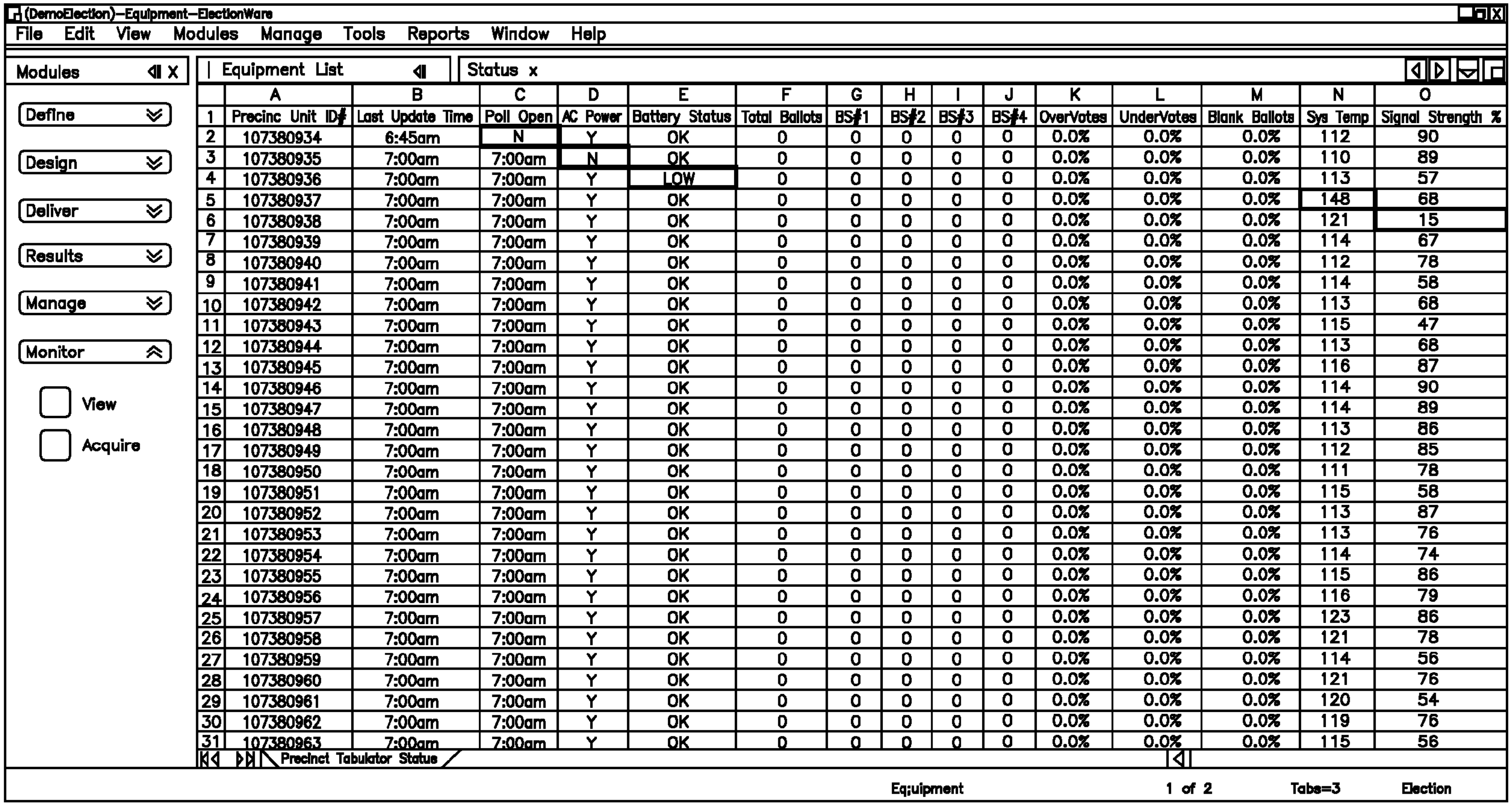

| | A | B | C | D | E | F | G | H | I | J | K | L | M | N | O |
|---|---|---|---|---|---|---|---|---|---|---|---|---|---|---|---|
| 1 | Precinc Unit ID# | Last Update Time | Poll Open | AC Power | Battery Status | Total Ballots | BS#1 | BS#2 | BS#3 | BS#4 | OverVotes | UnderVotes | Blank Ballots | Sys Temp | Signal Strength % |
| 2 | 107380934 | 6:45am | N | Y | OK | 0 | 0 | 0 | 0 | 0 | 0.0% | 0.0% | 0.0% | 112 | 90 |
| 3 | 107380935 | 7:00am | 7:00am | N | OK | 0 | 0 | 0 | 0 | 0 | 0.0% | 0.0% | 0.0% | 110 | 89 |
| 4 | 107380936 | 7:00am | 7:00am | Y | LOW | 0 | 0 | 0 | 0 | 0 | 0.0% | 0.0% | 0.0% | 113 | 57 |
| 5 | 107380937 | 7:00am | 7:00am | Y | OK | 0 | 0 | 0 | 0 | 0 | 0.0% | 0.0% | 0.0% | 148 | 68 |
| 6 | 107380938 | 7:00am | 7:00am | Y | OK | 0 | 0 | 0 | 0 | 0 | 0.0% | 0.0% | 0.0% | 121 | 15 |
| 7 | 107380939 | 7:00am | 7:00am | Y | OK | 0 | 0 | 0 | 0 | 0 | 0.0% | 0.0% | 0.0% | 114 | 67 |
| 8 | 107380940 | 7:00am | 7:00am | Y | OK | 0 | 0 | 0 | 0 | 0 | 0.0% | 0.0% | 0.0% | 112 | 78 |
| 9 | 107380941 | 7:00am | 7:00am | Y | OK | 0 | 0 | 0 | 0 | 0 | 0.0% | 0.0% | 0.0% | 114 | 58 |
| 10 | 107380942 | 7:00am | 7:00am | Y | OK | 0 | 0 | 0 | 0 | 0 | 0.0% | 0.0% | 0.0% | 113 | 68 |
| 11 | 107380943 | 7:00am | 7:00am | Y | OK | 0 | 0 | 0 | 0 | 0 | 0.0% | 0.0% | 0.0% | 115 | 47 |
| 12 | 107380944 | 7:00am | 7:00am | Y | OK | 0 | 0 | 0 | 0 | 0 | 0.0% | 0.0% | 0.0% | 113 | 68 |
| 13 | 107380945 | 7:00am | 7:00am | Y | OK | 0 | 0 | 0 | 0 | 0 | 0.0% | 0.0% | 0.0% | 116 | 87 |
| 14 | 107380946 | 7:00am | 7:00am | Y | OK | 0 | 0 | 0 | 0 | 0 | 0.0% | 0.0% | 0.0% | 114 | 90 |
| 15 | 107380947 | 7:00am | 7:00am | Y | OK | 0 | 0 | 0 | 0 | 0 | 0.0% | 0.0% | 0.0% | 114 | 89 |
| 16 | 107380948 | 7:00am | 7:00am | Y | OK | 0 | 0 | 0 | 0 | 0 | 0.0% | 0.0% | 0.0% | 113 | 86 |
| 17 | 107380949 | 7:00am | 7:00am | Y | OK | 0 | 0 | 0 | 0 | 0 | 0.0% | 0.0% | 0.0% | 112 | 85 |
| 18 | 107380950 | 7:00am | 7:00am | Y | OK | 0 | 0 | 0 | 0 | 0 | 0.0% | 0.0% | 0.0% | 111 | 78 |
| 19 | 107380951 | 7:00am | 7:00am | Y | OK | 0 | 0 | 0 | 0 | 0 | 0.0% | 0.0% | 0.0% | 115 | 58 |
| 20 | 107380952 | 7:00am | 7:00am | Y | OK | 0 | 0 | 0 | 0 | 0 | 0.0% | 0.0% | 0.0% | 113 | 87 |
| 21 | 107380953 | 7:00am | 7:00am | Y | OK | 0 | 0 | 0 | 0 | 0 | 0.0% | 0.0% | 0.0% | 113 | 76 |
| 22 | 107380954 | 7:00am | 7:00am | Y | OK | 0 | 0 | 0 | 0 | 0 | 0.0% | 0.0% | 0.0% | 114 | 74 |
| 23 | 107380955 | 7:00am | 7:00am | Y | OK | 0 | 0 | 0 | 0 | 0 | 0.0% | 0.0% | 0.0% | 115 | 86 |
| 24 | 107380956 | 7:00am | 7:00am | Y | OK | 0 | 0 | 0 | 0 | 0 | 0.0% | 0.0% | 0.0% | 116 | 79 |
| 25 | 107380957 | 7:00am | 7:00am | Y | OK | 0 | 0 | 0 | 0 | 0 | 0.0% | 0.0% | 0.0% | 123 | 86 |
| 26 | 107380958 | 7:00am | 7:00am | Y | OK | 0 | 0 | 0 | 0 | 0 | 0.0% | 0.0% | 0.0% | 121 | 78 |
| 27 | 107380959 | 7:00am | 7:00am | Y | OK | 0 | 0 | 0 | 0 | 0 | 0.0% | 0.0% | 0.0% | 114 | 56 |
| 28 | 107380960 | 7:00am | 7:00am | Y | OK | 0 | 0 | 0 | 0 | 0 | 0.0% | 0.0% | 0.0% | 121 | 76 |
| 29 | 107380961 | 7:00am | 7:00am | Y | OK | 0 | 0 | 0 | 0 | 0 | 0.0% | 0.0% | 0.0% | 120 | 54 |
| 30 | 107380962 | 7:00am | 7:00am | Y | OK | 0 | 0 | 0 | 0 | 0 | 0.0% | 0.0% | 0.0% | 119 | 76 |
| 31 | 107380963 | 7:00am | 7:00am | Y | OK | 0 | 0 | 0 | 0 | 0 | 0.0% | 0.0% | 0.0% | 115 | 56 |

FIG. 7

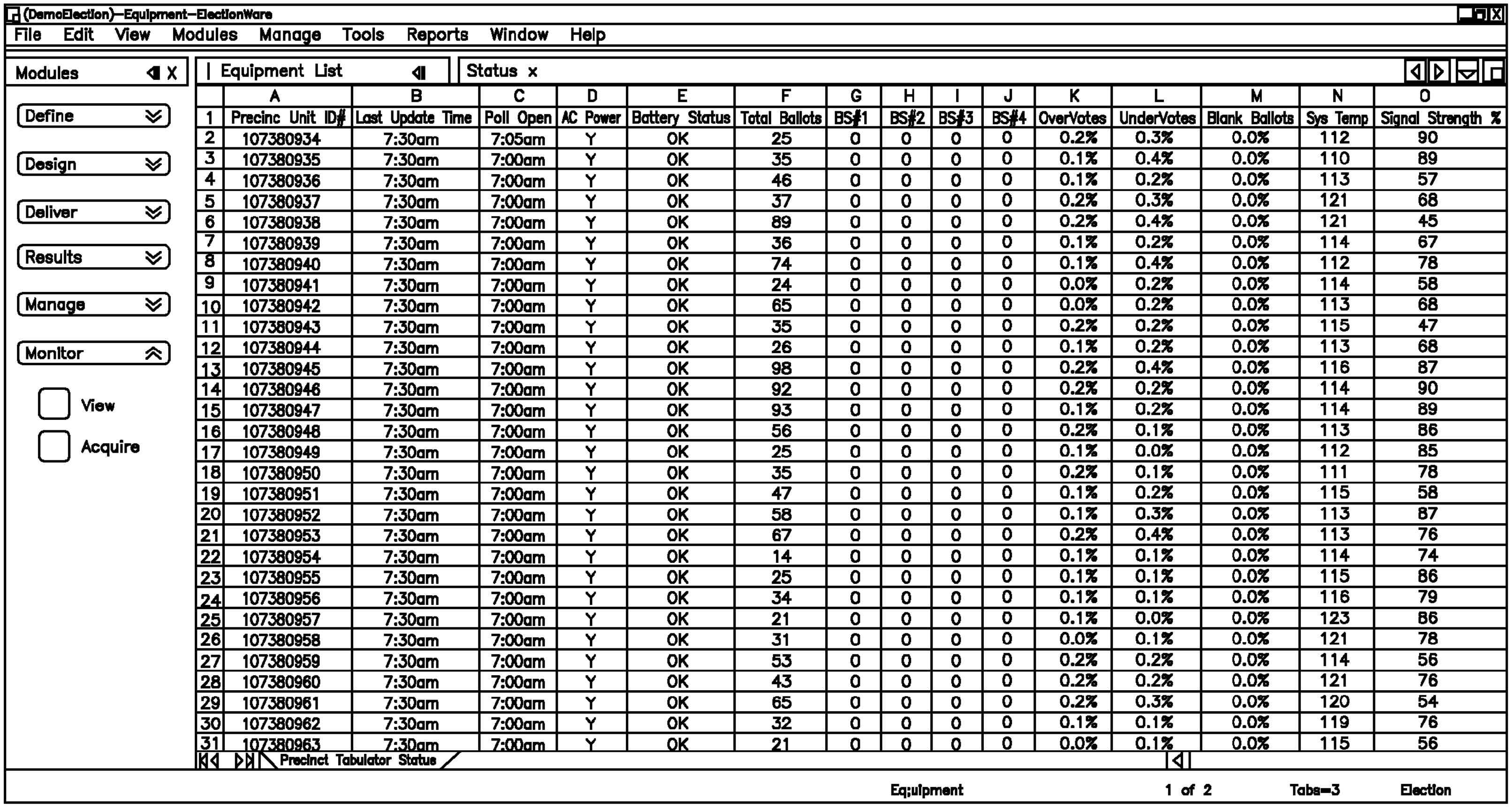

| | A | B | C | D | E | F | G | H | I | J | K | L | M | N | O |
|---|---|---|---|---|---|---|---|---|---|---|---|---|---|---|---|
| 1 | Precinc Unit ID# | Last Update Time | Poll Open | AC Power | Battery Status | Total Ballots | BS#1 | BS#2 | BS#3 | BS#4 | OverVotes | UnderVotes | Blank Ballots | Sys Temp | Signal Strength % |
| 2 | 107380934 | 7:30am | 7:05am | Y | OK | 25 | 0 | 0 | 0 | 0 | 0.2% | 0.3% | 0.0% | 112 | 90 |
| 3 | 107380935 | 7:30am | 7:00am | Y | OK | 35 | 0 | 0 | 0 | 0 | 0.1% | 0.4% | 0.0% | 110 | 89 |
| 4 | 107380936 | 7:30am | 7:00am | Y | OK | 46 | 0 | 0 | 0 | 0 | 0.1% | 0.2% | 0.0% | 113 | 57 |
| 5 | 107380937 | 7:30am | 7:00am | Y | OK | 37 | 0 | 0 | 0 | 0 | 0.2% | 0.3% | 0.0% | 121 | 68 |
| 6 | 107380938 | 7:30am | 7:00am | Y | OK | 89 | 0 | 0 | 0 | 0 | 0.2% | 0.4% | 0.0% | 121 | 45 |
| 7 | 107380939 | 7:30am | 7:00am | Y | OK | 36 | 0 | 0 | 0 | 0 | 0.1% | 0.2% | 0.0% | 114 | 67 |
| 8 | 107380940 | 7:30am | 7:00am | Y | OK | 74 | 0 | 0 | 0 | 0 | 0.1% | 0.4% | 0.0% | 112 | 78 |
| 9 | 107380941 | 7:30am | 7:00am | Y | OK | 24 | 0 | 0 | 0 | 0 | 0.0% | 0.2% | 0.0% | 114 | 58 |
| 10 | 107380942 | 7:30am | 7:00am | Y | OK | 65 | 0 | 0 | 0 | 0 | 0.0% | 0.2% | 0.0% | 113 | 68 |
| 11 | 107380943 | 7:30am | 7:00am | Y | OK | 35 | 0 | 0 | 0 | 0 | 0.2% | 0.2% | 0.0% | 115 | 47 |
| 12 | 107380944 | 7:30am | 7:00am | Y | OK | 26 | 0 | 0 | 0 | 0 | 0.1% | 0.2% | 0.0% | 113 | 68 |
| 13 | 107380945 | 7:30am | 7:00am | Y | OK | 98 | 0 | 0 | 0 | 0 | 0.2% | 0.4% | 0.0% | 116 | 87 |
| 14 | 107380946 | 7:30am | 7:00am | Y | OK | 92 | 0 | 0 | 0 | 0 | 0.2% | 0.2% | 0.0% | 114 | 90 |
| 15 | 107380947 | 7:30am | 7:00am | Y | OK | 93 | 0 | 0 | 0 | 0 | 0.1% | 0.2% | 0.0% | 114 | 89 |
| 16 | 107380948 | 7:30am | 7:00am | Y | OK | 56 | 0 | 0 | 0 | 0 | 0.2% | 0.1% | 0.0% | 113 | 86 |
| 17 | 107380949 | 7:30am | 7:00am | Y | OK | 25 | 0 | 0 | 0 | 0 | 0.1% | 0.0% | 0.0% | 112 | 85 |
| 18 | 107380950 | 7:30am | 7:00am | Y | OK | 35 | 0 | 0 | 0 | 0 | 0.2% | 0.1% | 0.0% | 111 | 78 |
| 19 | 107380951 | 7:30am | 7:00am | Y | OK | 47 | 0 | 0 | 0 | 0 | 0.1% | 0.2% | 0.0% | 115 | 58 |
| 20 | 107380952 | 7:30am | 7:00am | Y | OK | 58 | 0 | 0 | 0 | 0 | 0.1% | 0.3% | 0.0% | 113 | 87 |
| 21 | 107380953 | 7:30am | 7:00am | Y | OK | 67 | 0 | 0 | 0 | 0 | 0.2% | 0.4% | 0.0% | 113 | 76 |
| 22 | 107380954 | 7:30am | 7:00am | Y | OK | 14 | 0 | 0 | 0 | 0 | 0.1% | 0.1% | 0.0% | 114 | 74 |
| 23 | 107380955 | 7:30am | 7:00am | Y | OK | 25 | 0 | 0 | 0 | 0 | 0.1% | 0.1% | 0.0% | 115 | 86 |
| 24 | 107380956 | 7:30am | 7:00am | Y | OK | 34 | 0 | 0 | 0 | 0 | 0.1% | 0.1% | 0.0% | 116 | 79 |
| 25 | 107380957 | 7:30am | 7:00am | Y | OK | 21 | 0 | 0 | 0 | 0 | 0.1% | 0.0% | 0.0% | 123 | 86 |
| 26 | 107380958 | 7:30am | 7:00am | Y | OK | 31 | 0 | 0 | 0 | 0 | 0.0% | 0.1% | 0.0% | 121 | 78 |
| 27 | 107380959 | 7:30am | 7:00am | Y | OK | 53 | 0 | 0 | 0 | 0 | 0.2% | 0.2% | 0.0% | 114 | 56 |
| 28 | 107380960 | 7:30am | 7:00am | Y | OK | 43 | 0 | 0 | 0 | 0 | 0.2% | 0.2% | 0.0% | 121 | 76 |
| 29 | 107380961 | 7:30am | 7:00am | Y | OK | 65 | 0 | 0 | 0 | 0 | 0.2% | 0.3% | 0.0% | 120 | 54 |
| 30 | 107380962 | 7:30am | 7:00am | Y | OK | 32 | 0 | 0 | 0 | 0 | 0.1% | 0.1% | 0.0% | 119 | 76 |
| 31 | 107380963 | 7:30am | 7:00am | Y | OK | 21 | 0 | 0 | 0 | 0 | 0.0% | 0.1% | 0.0% | 115 | 56 |

*FIG. 8*

SYSTEM AND METHOD FOR MONITORING PRECINCT-BASED BALLOT TABULATION DEVICES

CROSS-REFERENCE TO RELATED APPLICATIONS

This application is based on and claims priority to U.S. Provisional Application Ser. No. 61/789,410, filed on Mar. 15, 2013, which is incorporated herein by reference in its entirety.

STATEMENT REGARDING FEDERALLY SPONSORED RESEARCH OR DEVELOPMENT

Not applicable.

BACKGROUND OF THE INVENTION

A variety of different types of voting equipment are used in the United States and throughout the world. In many jurisdictions, a voter receives a paper ballot on which various contests, i.e., voting options and corresponding mark spaces, are printed. The voter votes by darkening or otherwise marking the appropriate mark spaces on the paper ballot. The marked paper ballot may then be dropped in a ballot box, which is transferred to a central election office for tabulation by a high speed ballot tabulation device. Alternatively, many jurisdictions provide a smaller precinct-based ballot tabulation device at each polling place that allows a voter to directly insert her ballot into the device for tabulation.

Precinct-based ballot tabulation devices, such as the Model 100® and DS200® devices sold by Election Systems & Software, LLC, are well known to those skilled in the art. Upon scanning a paper ballot, the tabulation device alerts the voter if there are any ballot irregularities associated with the ballot, such as one or more under votes (when the voter has not made a voting selection for a contest) and one or more over votes (when the voter has made too many voting selections for a contest). The tabulation device also determines if the ballot is blank, which may have been caused by a voter using a writing instrument that the device cannot read. While the tabulation device will warn voters of these ballot irregularities, the voter often has the option to override the warning and allow the device to accept the ballot "as is." In doing so, the tabulation device will process the ballot according to the election rules for the state in which it is being used. For example, an over voted contest will typically not credit any candidate with a vote. At the end of the election day, the vote totals from the tabulation device are transmitted or otherwise provided to the central election office for accumulation with the vote totals of other tabulation devices in the jurisdiction. The central election office is then required to report the election results by voting precinct in accordance with state election laws.

The number of precinct-based ballot tabulation devices will vary from jurisdiction to jurisdiction depending on the size of the county and the number of voting precincts. Some jurisdictions will have as few as 20 tabulation devices in various locations, while others may have well over 1000 tabulation devices. Many jurisdictions (particularly large jurisdictions) find it very difficult to monitor all of the devices simultaneously. While the tabulation devices themselves are all self-contained computer systems that are designed and tested to withstand the rigors of transport, such devices are still electronic devices and the jurisdictions must be prepared for failure on election day. Many jurisdictions will purchase extra tabulation devices to have on hand for replacement of any failed devices on election day. However, monitoring when and where the extra tabulation devices are needed is currently handled through phone calls to a central election office, which is already over burdened by voter-related phone calls on election day. Information as to whether each and every tabulation device is operating correctly is critical to maintaining a smooth election day process.

BRIEF SUMMARY OF THE INVENTION

The present invention is directed to a system and method in which a central server is used to remotely monitor a plurality of ballot tabulation devices located at a plurality of polling locations. Each ballot tabulation device processes a plurality of marked paper ballots and maintains health status information for the device. The health status information may comprise statistical ballot tabulation information, such as statistical information relating to one or more over votes, under votes or blank ballots processed by the device, the number of ballots cast on the device, and/or the number of ballots having a particular ballot style cast on the device. The health status information may also comprise operating condition information, such as the battery charge of the device, the AC or DC power status of the device, the modem signal strength of the device, and/or the internal temperature of the device. In addition, the health status information may comprise poll information, such as the open/closed poll status of the device, the poll opening timestamp for the device, and/or the poll closing timestamp for the device. Optionally, each ballot tabulation device analyzes the health status information and generates one or more visual or audio alerts that identify any irregularities associated with the device.

Preferably, each ballot tabulation device encodes the health status information in a machine-readable code (e.g., a barcode) that is displayed on a display screen of the device. The machine-readable code may also encode information that identifies the ballot tabulation device. A poll worker or other operator then uses a reading device (e.g., a smart phone, tablet computer or other monitoring device) to read the machine-readable code from the display screen of the ballot tabulation device and transmit the health status information to the central server. In one embodiment, the reading device captures and transmits the machine-readable code itself to the central server over a communication network, wherein the central server decodes the health status information from the machine-readable code. In another embodiment, the reading device scans and decodes the health status information from the machine-readable code and transmits the decoded health status information to the central server over a communication network. Of course, the machine-readable code need not be displayed on the display screen of the ballot device, in which case the modem of the ballot tabulation device may be used to directly transmit the health status information to the central server over a communication network. Alternatively, the health status information could be transmitted from the ballot tabulation device to a specified device (e.g., a specified smart phone, tablet computer or other monitoring device known in the art) via a secure Bluetooth connection (or any other type of secure wireless connection) at periodic time intervals.

The central server is located remotely from the ballot tabulation devices and periodically receives the health status information for each device. The central server then generates an alert that identifies any irregularities associated with the ballot tabulation devices based on the received health status information. In one embodiment, the alert comprises a report that provides the health status information for all of the ballot tabulation devices and identifies any irregularities associated with one or more of the devices. In another embodiment, the central server generates a plurality of alerts each of which comprises a specific indication of an irregularity associated with one of the ballot tabulation devices. One skilled in the art will appreciate that the present invention allows for proactive problem solving with respect to the operation of the ballot tabulation devices and promotes voter confidence in the election day process.

BRIEF DESCRIPTION OF THE DRAWINGS

Various exemplary embodiments of the present invention are described in detail below with reference to the attached drawing figures, wherein:

FIG. 7 is an exemplary screen shot of a report showing health status information for various ballot tabulation devices with alerts corresponding to five devices identified on the report; and FIG. 8 is an exemplary screen shot of a report showing health status information for various ballot tabulation devices with no alerts identified on the report.

DETAILED DESCRIPTION OF EXEMPLARY EMBODIMENTS

The present invention is directed to a system and method for monitoring a plurality of voting devices located at a plurality of polling locations. While the invention will be described in detail below with reference to various exemplary embodiments of a ballot tabulation device (i.e., an optical scanner used to scan and process marked paper ballots), it should be understood that the invention is not limited to the specific configuration or methodology of these embodiments. For example, the invention could also be used on other types of voting devices, such as ballot marking devices and direct record electronic (DRE) voting machines. In addition, although the exemplary embodiments are described as embodying several different inventive features, one skilled in the art will appreciate that any one of these features could be implemented without the others in accordance with the invention.

Figure 1:
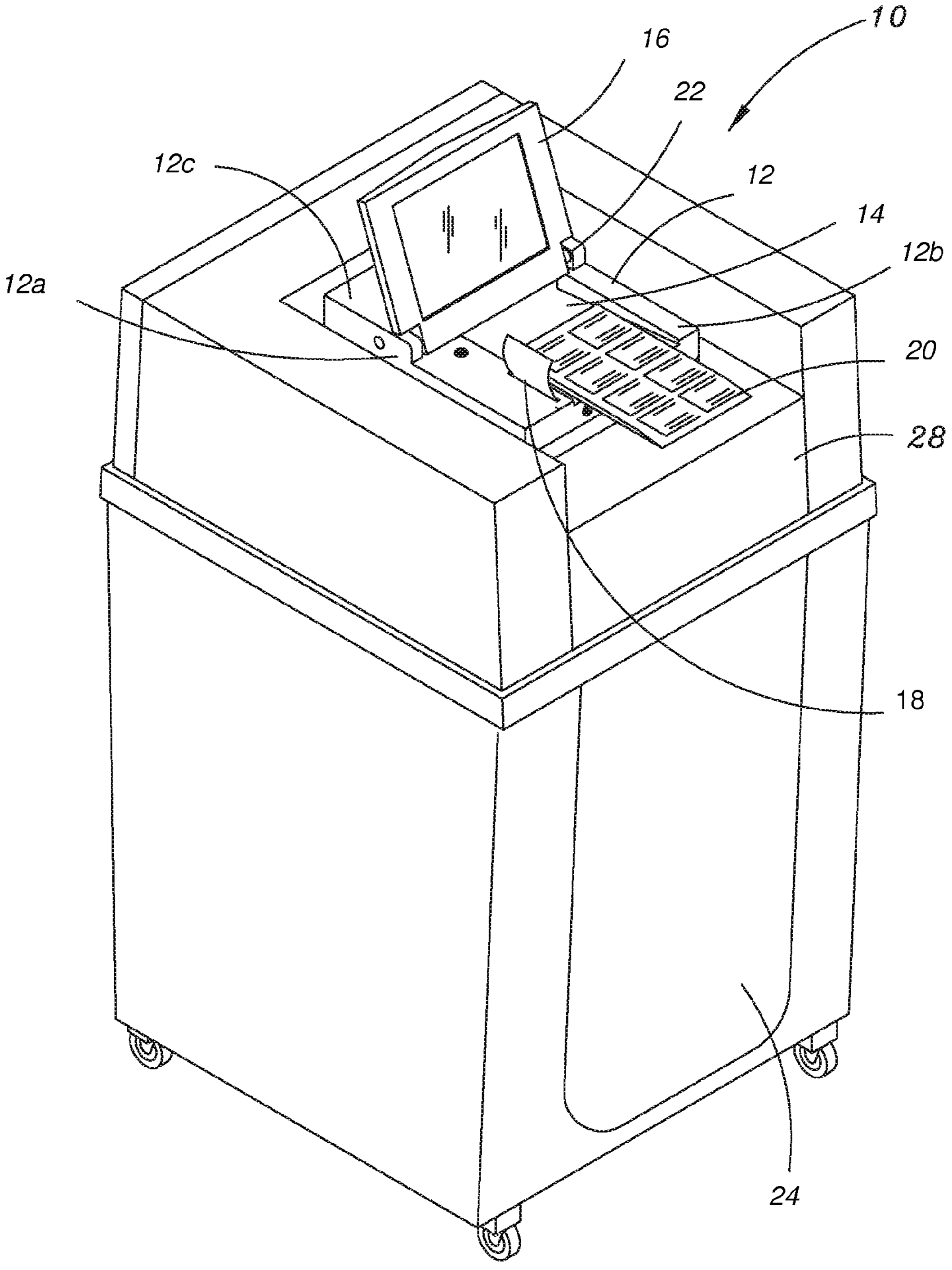
FIG. 1 is a perspective view of an exemplary embodiment of a ballot tabulation device in accordance with the present invention.

Referring to FIG. 1, an exemplary embodiment of a ballot tabulation device in accordance with the present invention is shown as reference numeral 10. Ballot tabulation device 10 generally includes a protective housing 12 with various internal components (as described in detail with reference to FIGS. 2A and 2B), a ballot insertion tray 14, a display 16 and a report printer 18. Each of these components will be described in detail below.

Protective housing 12 is preferably made of injection molded plastic and has a modular "clamshell" design that provides easy access for maintenance and set up activities. Of course, other materials and designs are also within the scope of the present invention. Protective housing 12 preferably comprises three primary sections to assist in ease of manufacture and maintenance: base section 12*a*, front cover section 12*b*, and rear cover section 12*c*. In addition, various access doors (not shown) may be included to provide access to a variety of switches, connections and interfaces. For example, in an exemplary embodiment, a locked access door is provided to secure access to a power switch, a "close polls" switch, and a modem with an RJ-II connection and antenna (discussed further in connection with the main access board 44 of FIG. 2B). Another locked access door is provided to secure access to various USB port interfaces for removable USB flash drives (discussed further in connection with the USB board 42 of FIG. 2B).

The back of protective housing 12 preferably includes a variety of external ports (not shown), such as a USB hub 48 (FIG. 2A) and other types of ports that are standard and well known in the art. Of course, the external ports may be located in other locations provided they do not interfere with the use of the ballot tabulation device 10.

Ballot insertion tray 14 is provided to receive a paper ballot for scanning and tabulation. Ballot insertion tray 14 is preferably molded into the front cover section 12*b* of protective housing 12 and is approximately 8.525 inches wide in order to accommodate an 8.5 inch wide standard-size ballot, such as ballot 20 shown in FIG. 1. Ballot insertion tray 14 can, however, be designed to fit any size ballot. An additional tray insert (not shown) having reversible paper guides may be mounted into ballot insertion tray 14. For example, when the paper guides are oriented down, ballot insertion tray 14 may accommodate an 8.5 inch wide ballot. When the paper guides are oriented up, a 4.25 inch wide ballot may be supported. An arrow graphic is also preferably molded onto ballot insertion tray 14 or additional tray insert to indicate the proper insertion of the ballot. Lastly, ballot insertion tray 14 preferably has a ribbed texture to assist with reducing static buildup.

Display 16 is preferably an LCD touch screen display configured to provide a voter interface used to communicate information associated with a scanned paper ballot to the voter (e.g., ballot irregularities such as over votes, under votes, and blank ballots) and receive voter feedback. Display 16 is connected to the upper portion of ballot tabulation device 10 by two hinges 22, one located on each side of the display, which enable display 16 to open up during use or fold down flat during storage. For security and protection, display 16 preferably incorporates a locking mechanism. Ballot tabulation device 10 may include an LCD switch 50 (FIG. 2A) that will sense that display 16 is open to thereby power up without necessitating a polling official physically turning on the display 16. Similarly, LCD switch 50 will sense that the display 16 is closed to thereby power down after a specified period of time.

Alternatively, if display 16 is not configured as a touch screen display, ballot tabulation device 10 would also include another type of input device, such as a keypad, a joystick, a pointing device, a trackball or a touch pad. It may also comprise a cathode ray tube (CRT) display configured as a touch screen display located external to ballot tabulation device 10. In such a configuration, the display would be connected to ballot tabulation device 10 through a dedicated I/O connector of ballot tabulation device 10. Of course, other types of displays and input devices are also possible and within the scope of the present invention.

Report printer 18 is an internal printer for device level and polling place level reporting, including the printing of reports at poll opening and poll closing (as are known in the art). Report printer 18 is a standard printer that is readily available and well known to those skilled in the art. Report printer 18 is capable of printing on paper that is approximately 3 inches wide and is of the drop-in roll paper type. As shown in FIG. 1, the paper passes through an aperture in protective housing 12 such that it is easily accessible by users.

As shown in FIG. 1, ballot tabulation device 10 mounts onto the top of a ballot receptacle 24. The base of ballot tabulation device 10 includes four mounting feet (not shown) that provide airflow under the unit and allow it to be securely inserted into a recessed area of the ballot receptacle 24. In this embodiment, ballot tabulation device 10 slides onto mounting rails (not shown) located on top of the ballot receptacle 24. A hinged door (not shown) may be located on the front of the ballot receptacle 24 and may be raised up and locked into place to further secure ballot tabulation device 10. Ballot receptacle 24 is preferably made of steel or a durable plastic material for security purposes. In operation, scanned and tabulated ballots are deposited directly into ballot receptacle 24. In addition, ballot receptacle 24 preferably includes a compartment 26 that polling officials can use to temporarily store uncounted ballots in the event of a power failure, scanner error, or the like. Of course, ballot receptacle 24 may have other configurations as are well known to those skilled in the art.

Figure 2A:
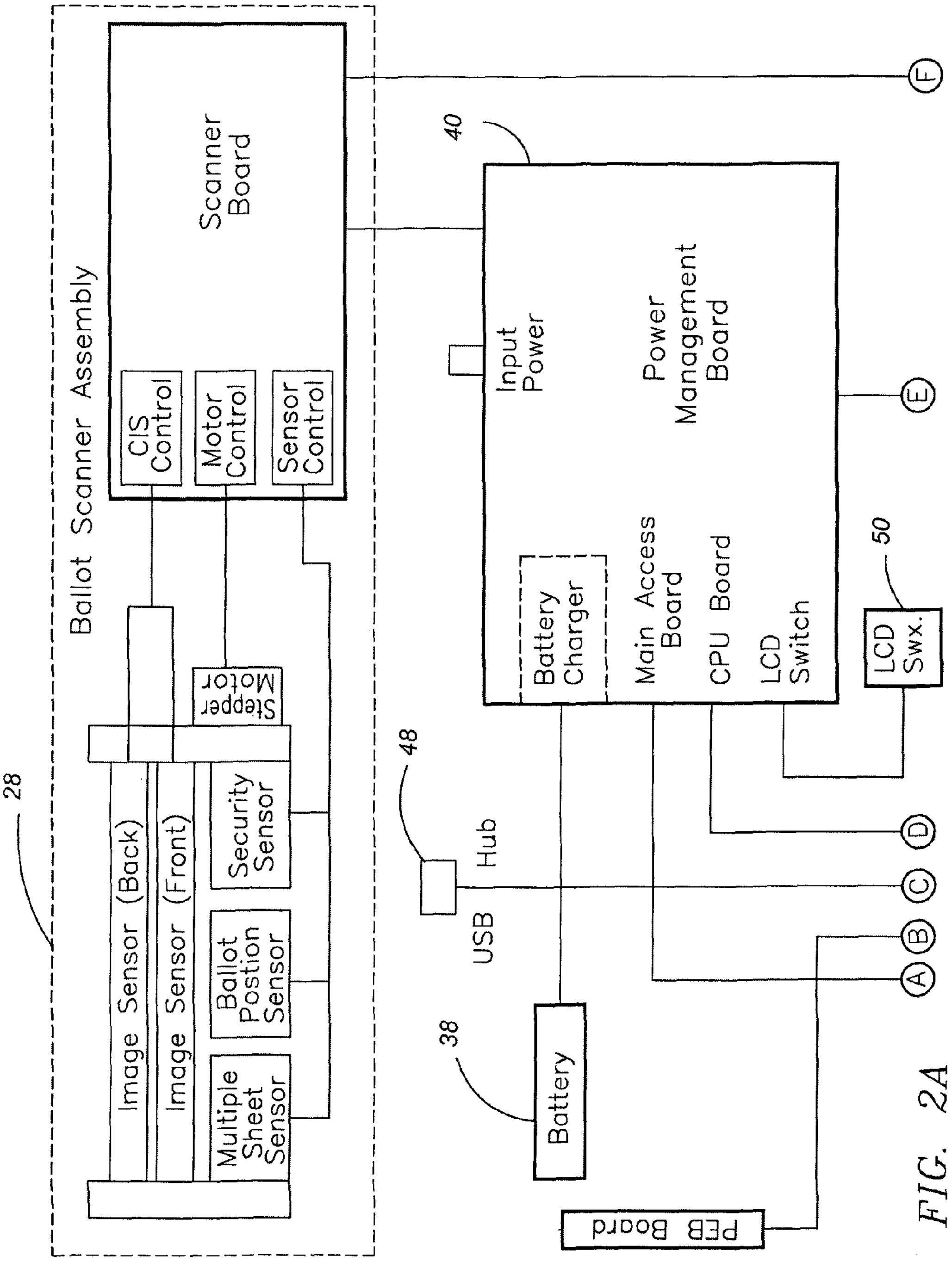
FIGS. 2A and 2B are block diagrams of the various internal components of the ballot tabulation device of FIG. 1.
Figure 2B:
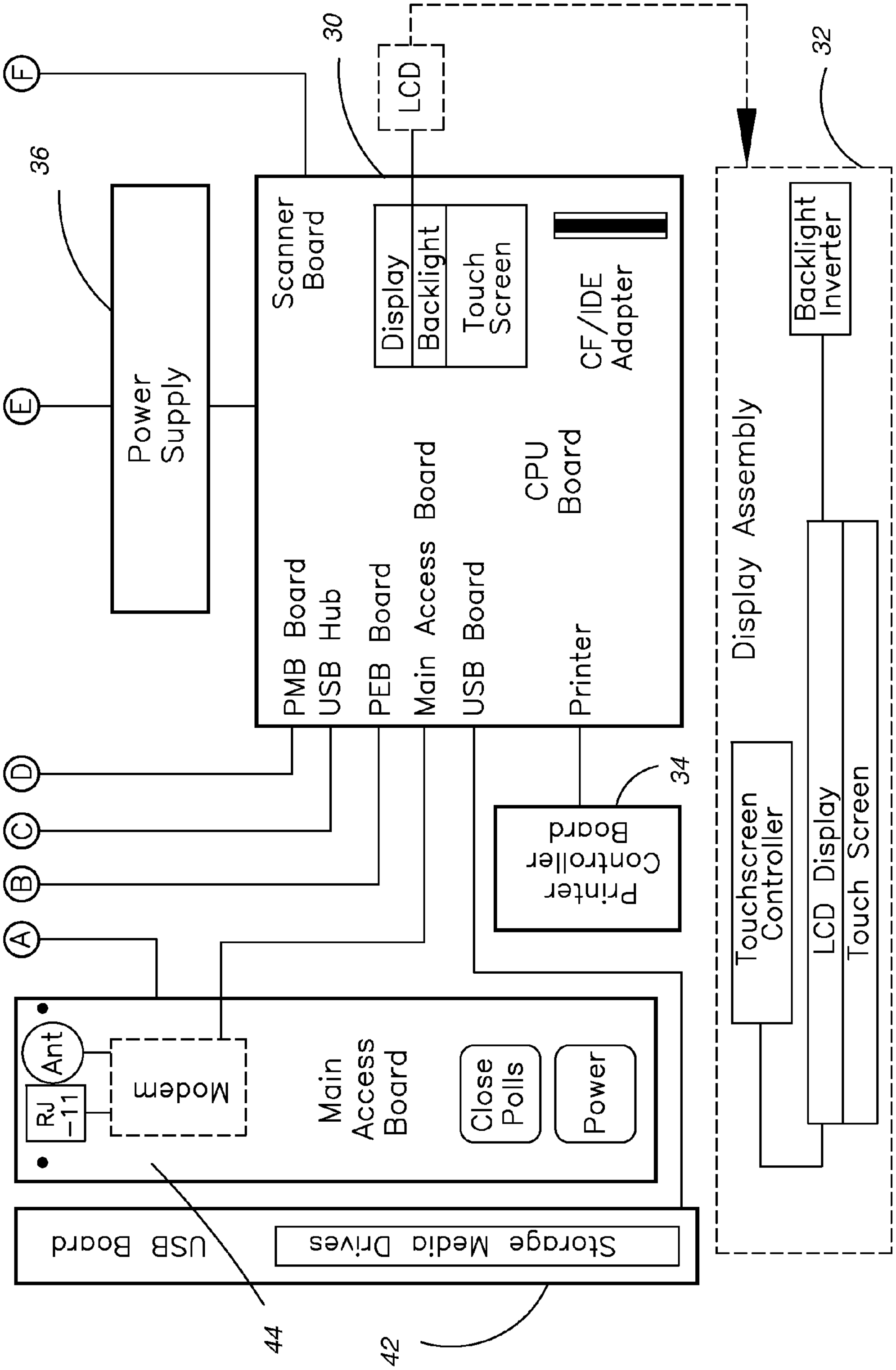

Turning to FIGS. 2A and 2B, the internal components of ballot tabulation device 10 are shown in a block diagram format and generally include: a ballot scanner assembly 28, a CPU board 30, a display assembly 32, a printer controller board 34, an internal power supply 36, an internal battery pack 38, a power management board 40, a USB board 42, a main access board 44, a USB hub 48, and an LCD switch 50 (discussed above). It should be understood that the various components and subsystems are connected to each other as shown in FIGS. 2A and 2B.

The ballot scanner assembly 28 includes a scanner board that provides the image capture, processing and transport control functions associated with scanning a paper ballot. The ballot scanner assembly 28 utilizes a set of sensors to monitor each paper ballot as it is placed in ballot insertion tray 14 of ballot tabulation device 10 and travels through the ballot transport mechanism (not shown). These sensors detect the position of the ballot, check for multiple ballots and confirm the release of the ballot into ballot receptacle 24. There may also be a security sensor that detects counterfeit ballots and ballots that have been tampered with. The ballot scanner assembly 28 utilizes two contact image sensors to produce a bitmap image of the paper ballot (preferably at 200 dpi or greater). One contact image sensor is positioned to read the top surface of the ballot and the other contact image sensor is positioned to read the bottom surface of the ballot. The imaging of the top and bottom surfaces of the ballot preferably occurs simultaneously. The paper ballot is pulled across the contact image sensors to capture the ballot image. In an exemplary embodiment, the ballot scanner assembly 28 utilizes image capture technology available from Ricoh Electronics, Inc. The ballot image captured by the ballot scanner assembly 28 is passed to CPU board 30, which decodes and tabulates the voting selections marked on the scanned ballot (described further below).

The CPU board 30 is a commercial off-the-shelf board that generally controls the operation of ballot tabulation device 10. CPU board 30 is preferably capable of executing at least two independent processes concurrently. Accordingly, it is preferable to use an operating system that includes multi-tasking functionality, such as Linux and other operating systems known in the art. In this embodiment, CPU board 30 is a VIA Embedded Platform EPIA-CL with a VIA C3™ or VIA Eden™ ESP processor. The CPU board 30 may include any type of memory that is suitable for storing information necessary for the operation of ballot tabulation device 10, as is well known in the art.

Many of the other internal components of ballot tabulation device 10 are also well known in the art. For example, display assembly 32 includes display 16 (described above), a backlight inverter and a touch screen controller that provides an interface to display 16. Printer controller board 34 provides an interface to report printer 18. In addition, USB hub 48 provides a plurality of external USB ports that provide a connection for a variety of external devices.

USB board 42 includes a plurality of external USB port interfaces that accommodate removable USB flash drives or any other type of removable data storage system. Preferably, at least one of the USB port interfaces is unidirectional as described in U.S. Pat. No. 7,840,742, which is incorporated by reference in its entirety. The removable USB flash drives may be used to store the election definition that allows the ballot tabulation device 10 to decode the paper ballot in accordance with the ballot style of the ballot. The removable USB flash drives may also be used to store the accumulated vote totals for ballot tabulation device 10 and the images of the scanned ballots. Further, as discussed below, the removable USB flash drives may be used to store health status information for ballot tabulation device 10, which may be accessed periodically throughout election day or at a later time for audit purposes.

Main access board 44 includes a power switch and a "close polls" switch. Main access board 44 also includes a modem with an RJ-11 connector and antenna, which provide both landline and wireless modem options capable of transmitting vote results to a central election office. In addition, the modem may also transmit health status information for ballot tabulation device 10 to the central election office, as discussed below.

Ballot tabulation device 10 is powered by a power management subsystem that includes power management board 40, internal battery pack 38, and internal ITX power supply 36. Power management board 40 is a custom power supply board that receives its input from an external brick power supply that operates on standard AC-volt lines. Internal battery pack 38 is preferably a rechargeable Lithium-Ion type and provides up to two hours of operation during a loss of AC power. Internal ITX power supply 36 provides power to CPU board 30, as is known in the art. Power management board 40 monitors the status of and charges internal battery pack 38, and automatically switches from the external brick power supply to the internal battery pack 38 as needed.

Figure 3:
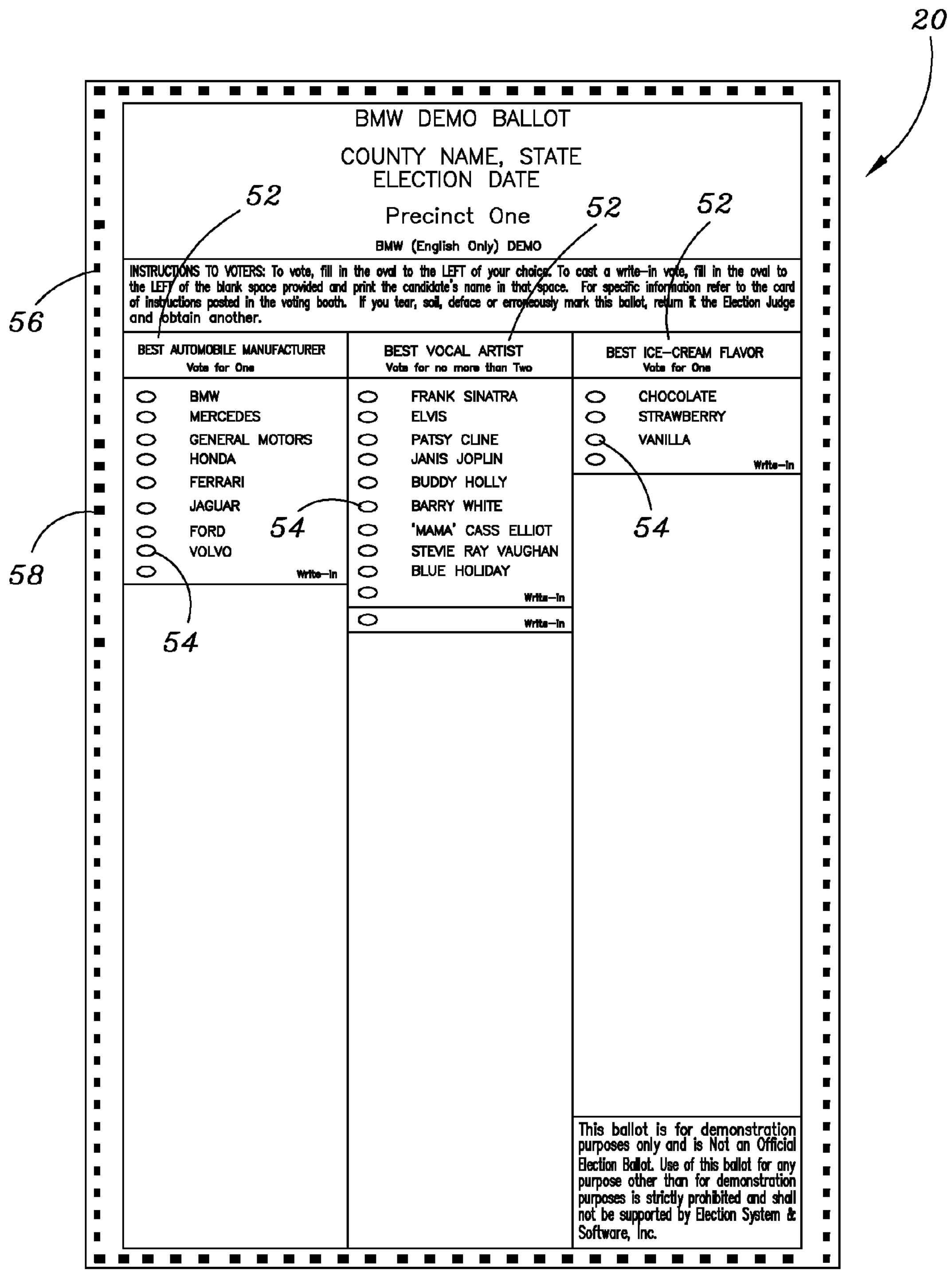
FIG. 3 is a plan view of an exemplary paper ballot that may be scanned and tabulated by the ballot tabulation device of FIG. 1.

With reference to FIG. 3, an exemplary paper ballot that may be scanned and tabulated by ballot tabulation device 10 is shown generally as reference numeral 20. Ballot 20 includes printed indicia 52 that describe each contest (e.g., Best Automobile Manufacturer) and the names of the candidates associated with each contest (e.g., BMW, Mercedes, General Motors, Honda, Ferrari, Jaguar, Ford and Volvo).

Ballot 20 also includes mark spaces 54 corresponding to each of the candidates in each contest. As is known in the art, a voter may darken or otherwise mark the mark space corresponding to his/her voting selection for each of the contests. Alternatively, a voter may utilize a ballot marking device to print a mark in each of the appropriate marks spaces, such as the AutoMARK® ballot marking device sold by Election Systems & Software, LLC. Ballot 20 further includes a series of timing marks 56 positioned along and down the left and right sides and across the top and bottom of the ballot. The timing marks 56 permit ballot tabulation device 10 to determine the position (i.e., row and column) of each of the mark spaces 54 on the ballot. Ballot 20 further includes a plurality of code channel marks 58 positioned adjacent certain timing marks 56 on the left side of the ballot. In this example, each code channel mark 58 abuts its corresponding timing mark 56 so as to provide the appearance of a single mark. Alternatively, the code channel marks 58 may be located a distance from the timing marks 56. The code channel marks 58 are used to identify the ballot style and precinct of ballot 20 so that ballot tabulation device 10 is able to associate the marked voting selections with the correct contests and candidates printed on the ballot.

As stated above, ballot tabulation device 10 uses the ballot definition stored on removable USB flash drives to decode ballot 20 based on the ballot style determined from the code channel marks 58. The election definition is commonly created via an election management system (EMS), which is typically used at a central election office. The EMS system enables an administrator to create an election database that includes all of the district, contest, candidate and precinct information for the jurisdiction. This information is used to create the election definition files for each of the tabulation devices in the jurisdiction.

To operate ballot tabulation device 10, a polling official first opens the poll by depressing the "power" switch located on the main access board 44 of ballot tabulation device 10 and transferring the election definition data to ballot tabulation device 10. For example, a removable USB flash drive may be inserted into one of the USB ports of USB board 42 to transfer the election definition data. Of course, other transfer means are also within the scope of the present invention.

After transfer of the election definition data, ballot tabulation device 10 is ready to scan and tabulate paper ballots. The voting process for a single voter will be described with reference to blocks 60 to 82 of the process flow diagram shown in FIGS. 4A-4B. However, it should be understood that this voting process would be repeated for each of the voters at the polling place.

Figure 4A:
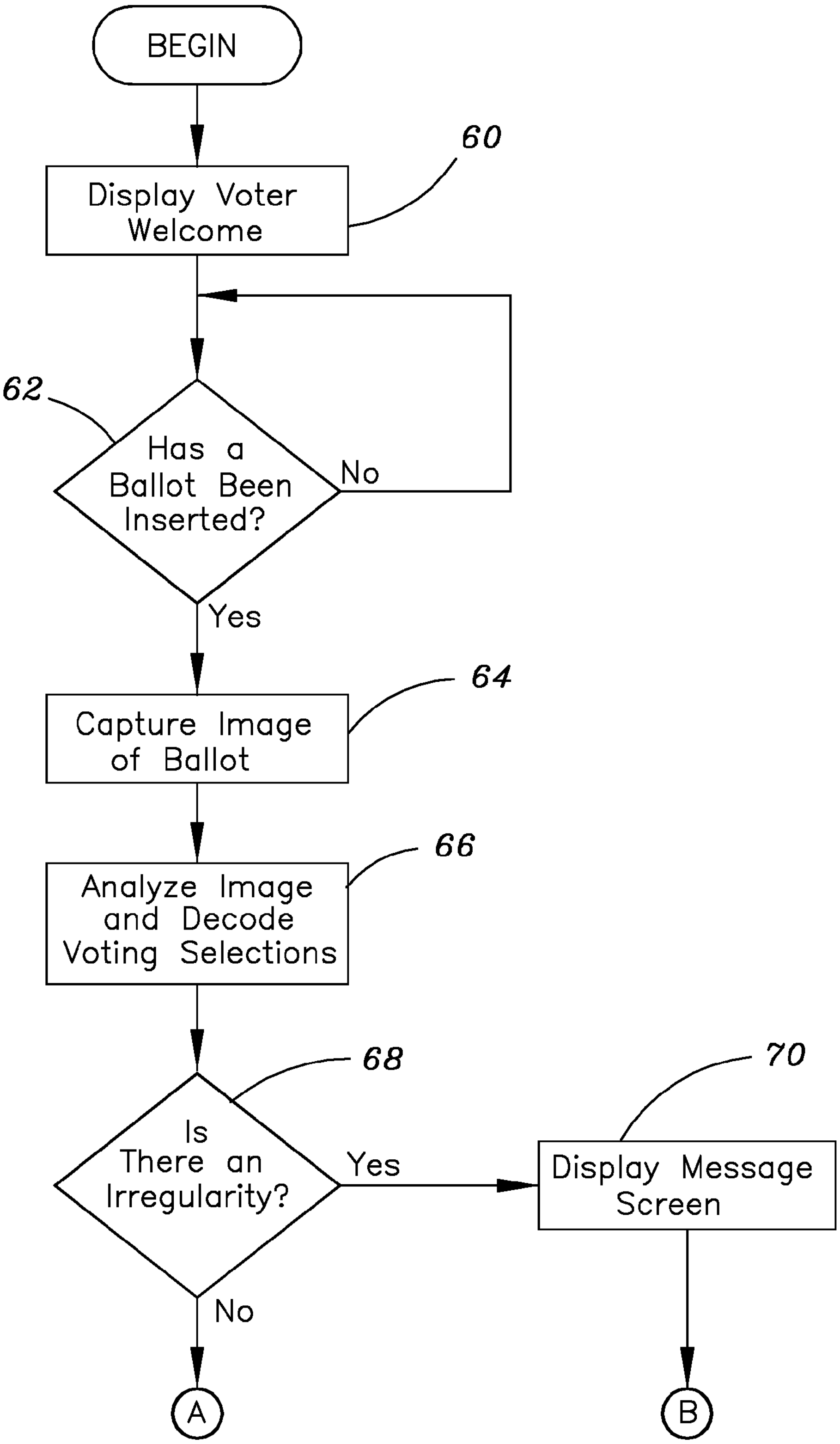
FIGS. 4A and 4B are process flow diagrams of an exemplary voting process using the ballot tabulation device of FIG. 1.
Figure 5A:
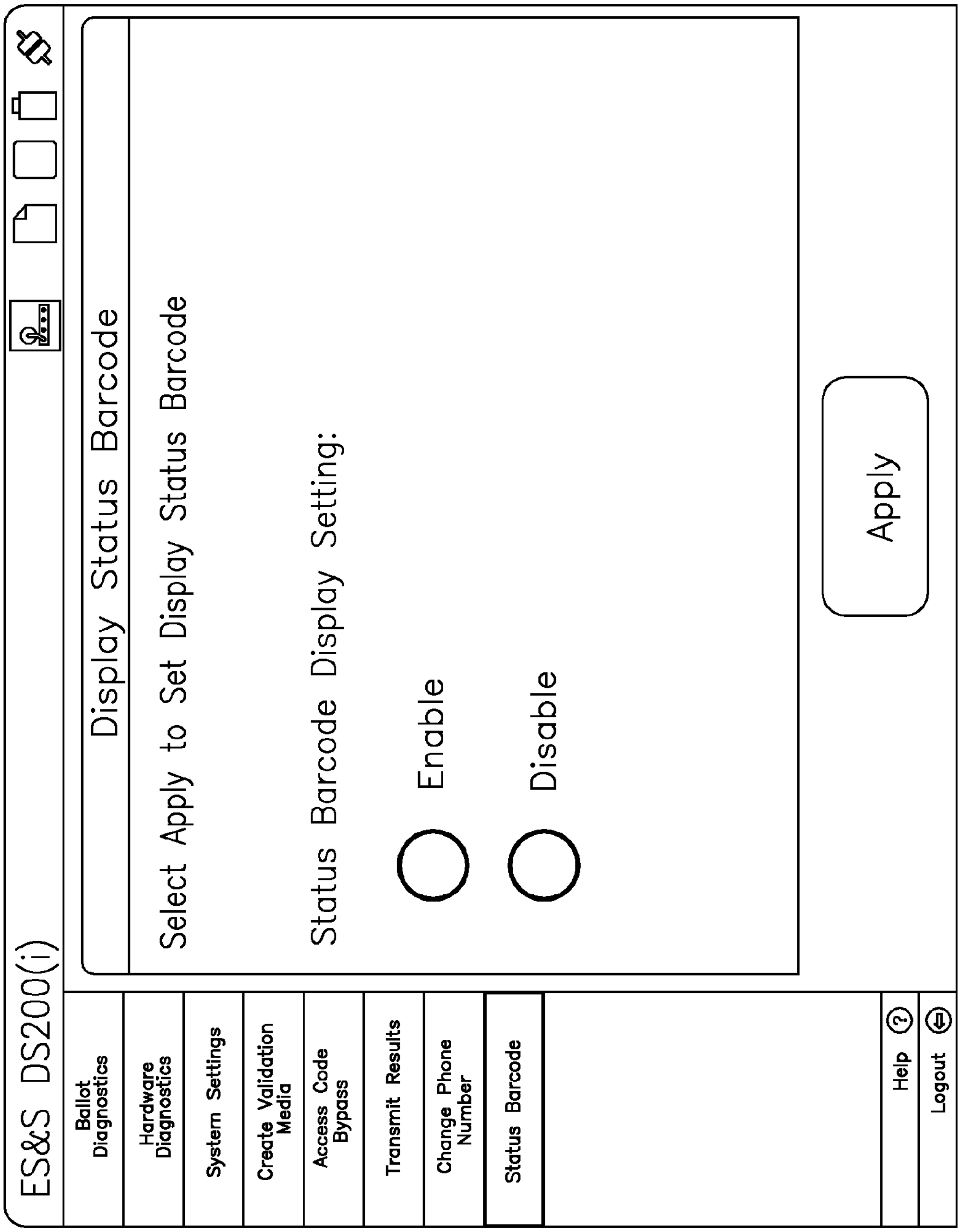
FIG. 5A is an exemplary screen shot of a display status barcode screen provided by the ballot tabulation device of FIG.
Figure 5B:
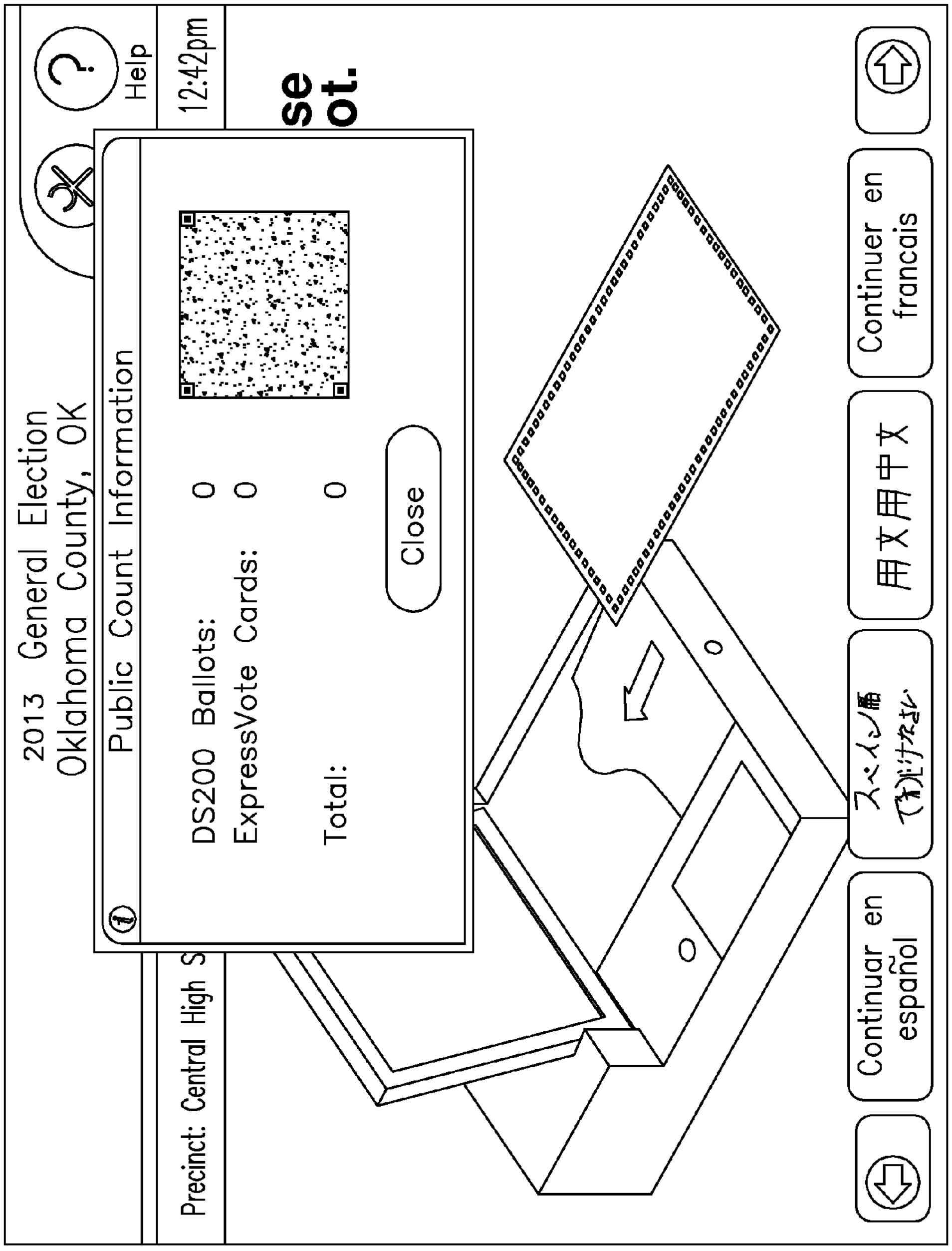
FIG. 5B is an exemplary screen shot of a welcome screen provided by the ballot tabulation device of FIG. 1 with a pop-up window displaying a barcode that encodes health status information for the device.
Figure 6A:
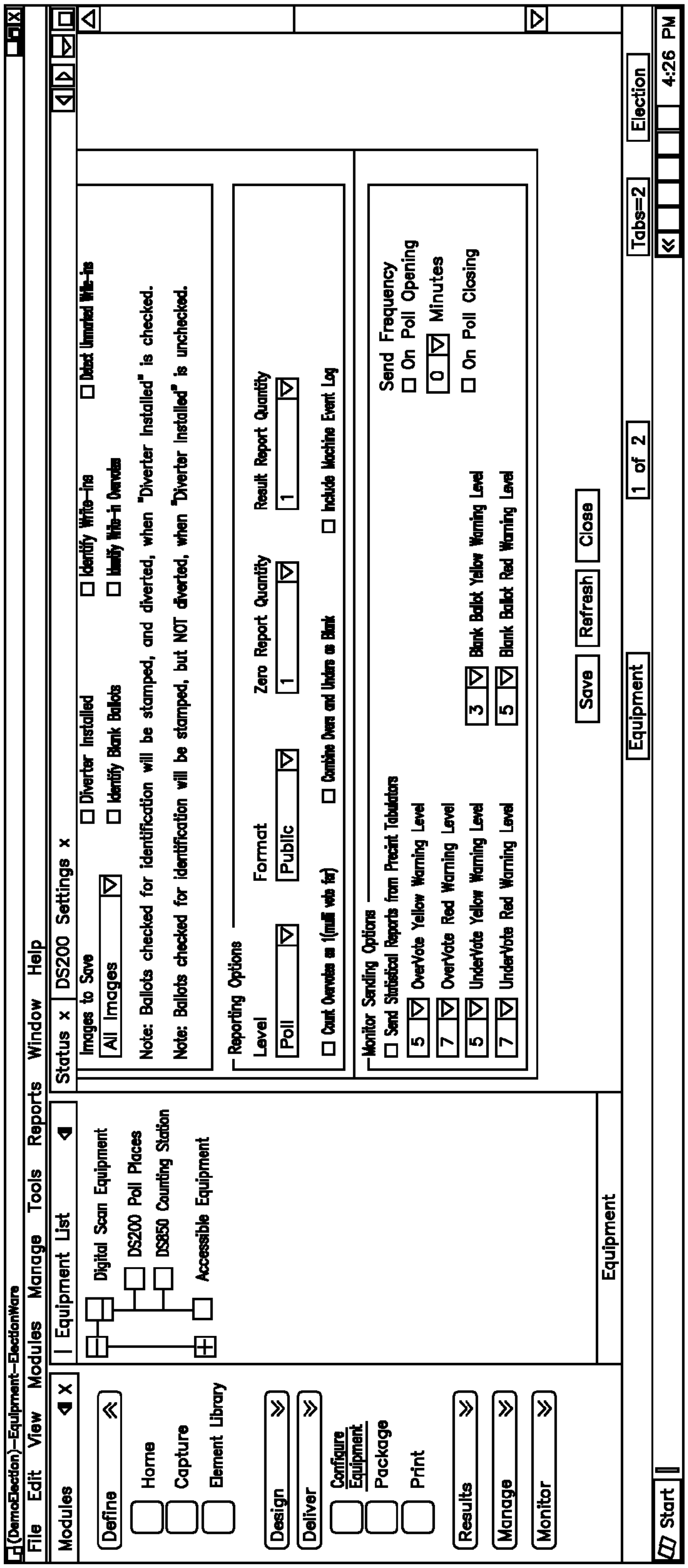
FIG. 6A is an exemplary screen shot of a configuration screen provided by the election management system showing various monitoring options.
Figure 6B:
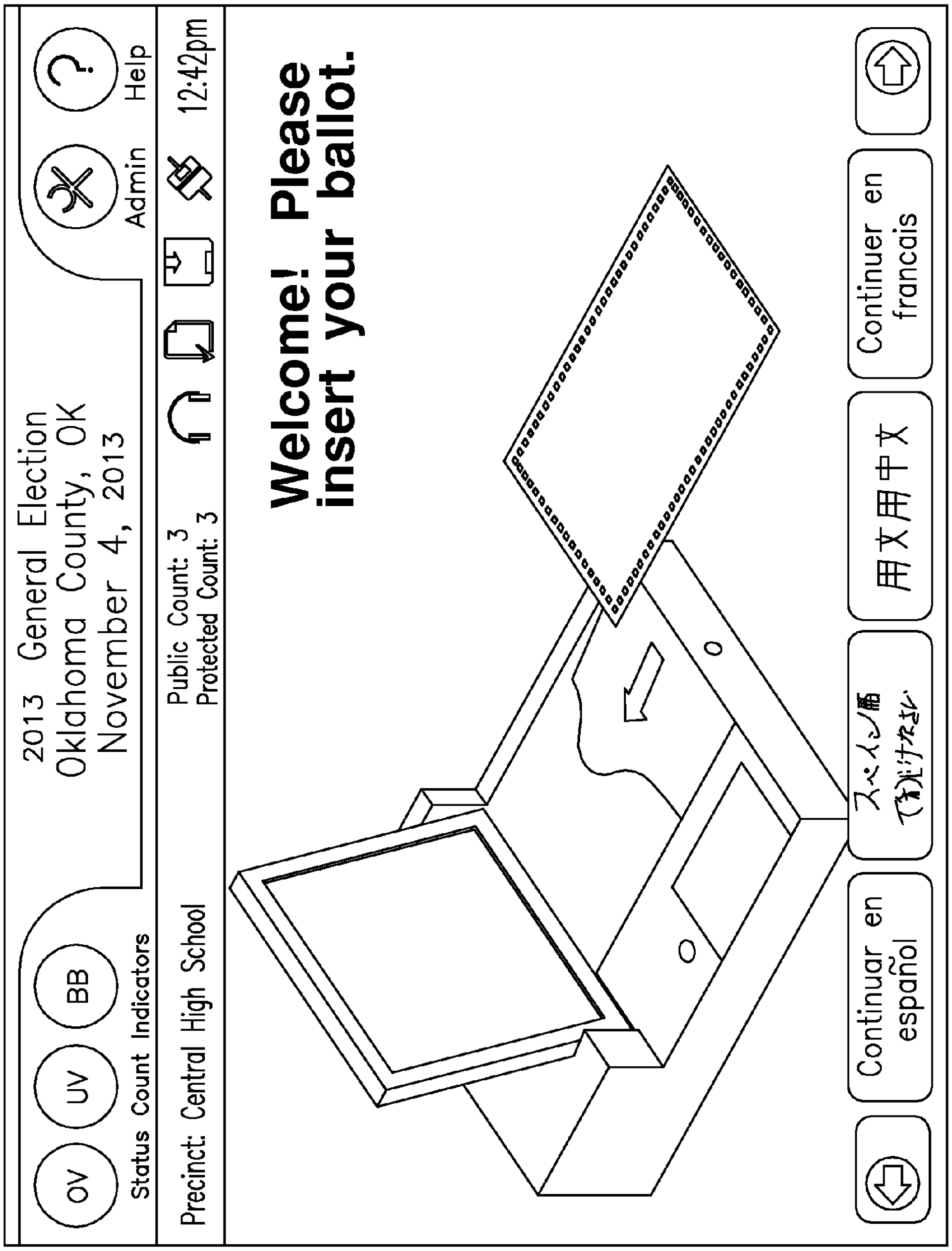
FIG. 6B is an exemplary screen shot of a welcome screen provided by the ballot tabulation device of FIG. 1 displaying status count indicators.

Referring to FIG. 4A, at block 60, the ballot tabulation device 10 displays a "welcome" screen on display 16 such as those shown in FIGS. 5B and 6B. The "welcome" screens of FIGS. 5B and 6B are provided in connection with two different exemplary embodiments of the present invention (discussed below). However, it can be seen that certain information is displayed on both screens. For example, each screen displays a message (e.g., "Welcome. Please insert your ballot.") and a graphical depiction of the ballot tabulation device demonstrating the proper insertion of the ballot into the ballot insertion tray (wherein the demonstration may be either static or moving). Each screen also includes a horizontally scrollable list of available languages at the bottom of the screen. The list of languages can be customized to include the most frequently used languages for a particular precinct location.

Also, header information is provided at the top of each screen, including general information about the election (e.g., "2013 General Election; Oklahoma County, Okla.; Nov. 4, 2013"), a precinct identifier (e.g., "Precinct: Central High School"), a protected count consisting of a total number of ballots cast on ballot tabulation device 10 over the entire life of the device (e.g., "Protected Count: 3"), and a public count consisting of a running total of the number of ballots cast on ballot tabulation device 10 during a particular election (e.g., "Public Count: 3").

A "Help" button and an "Admin" button are also provided in the upper-right corner of each screen. Upon selection of the "Help" button, a pop-up window designed to provide more detailed information regarding the particular operation of ballot tabulation device 10 is displayed. For example, a pop-up window that may be displayed during poll opening would list the steps required to open the poll for voting. Upon selection of the "Admin" button, various administrative functions related to the operation of ballot tabulation device 10 are accessible (preferably upon entry of a password), as discussed further below.

Four system information icons are displayed directly below the "Admin" and "Help" buttons. These icons are non-selectable and are used primarily by poll workers and other non-voter users to monitor the operation of ballot tabulation device 10. The system information icons comprise, from left to right, an "accessible voting station status" headphones icon (for embodiments in which the tabulation device is connected to an accessible voting station), an "election definition found" icon (which will include a small red "X" if the election definition is not found), an "additional ballot image storage found" icon (which will include a small red "X" if additional ballot image storage is not found), and a "running on AC power" icon. The "running on AC power" icon will be replaced with a "battery" icon when ballot tabulation device 10 is running on battery power. This "battery" icon will preferably be displayed in five states representing the available capacity of the battery, i.e., 100%, 75%, 50%, 25% and 0%. The "battery" icon may flash when the battery capacity drops below a predetermined level.

Referring back to FIG. 4A, at block 62, the ballot position sensors continuously monitor whether a paper ballot has been inserted into the ballot insertion tray 14 and, upon detection of a ballot, the ballot is fed into the ballot scanner assembly 28. Upon receiving a paper ballot at block 64, the ballot scanner assembly 28 scans the paper ballot so as to capture an image of the ballot. For double-sided ballots, both sides of the paper ballot are preferably scanned simultaneously so as to capture an image of each side of the ballot.

At block 66, the CPU board 30 analyzes the captured image of the ballot so as to decode the voting selections marked on the ballot. Preferably, the voting selections are decoded using intelligent mark recognition (IMR) technology as described in U.S. Pat. No. 6,854,644, which is incorporated by reference in its entirety. As discussed above, the ballot contains code channel marks 58 that allow the CPU board 30 to verify that the ballot is valid for a specific polling place, and, to select the proper ballot style (which is provided as part of the election definition loaded into the ballot tabulation device 10 via the removable USB flash drive at poll opening) for decoding the voting selections marked on the ballot.

At block 68, ballot tabulation device 10 identifies any ballot irregularities associated with the paper ballot (e.g., over votes, under votes and blank ballots), as well as any scanning errors (e.g., read errors or unclear marks). At block 70, if one or more ballot irregularities or errors are detected, ballot tabulation device 10 displays an "error" screen with an appropriate message on display 16 identifying the nature of the identified ballot irregularities or errors. The "error" screen provides clear feedback to the voter on the disposition of his/her paper ballot. In particular, the "error" screen may display a notification that one or more contests are not correctly voted, a list of encountered error types, and the number of contests affected with each listed error type. The "error" screen may also include two selection buttons—"Don't Cast—Return Ballot" and "Cast Ballot."

Figure 4B:
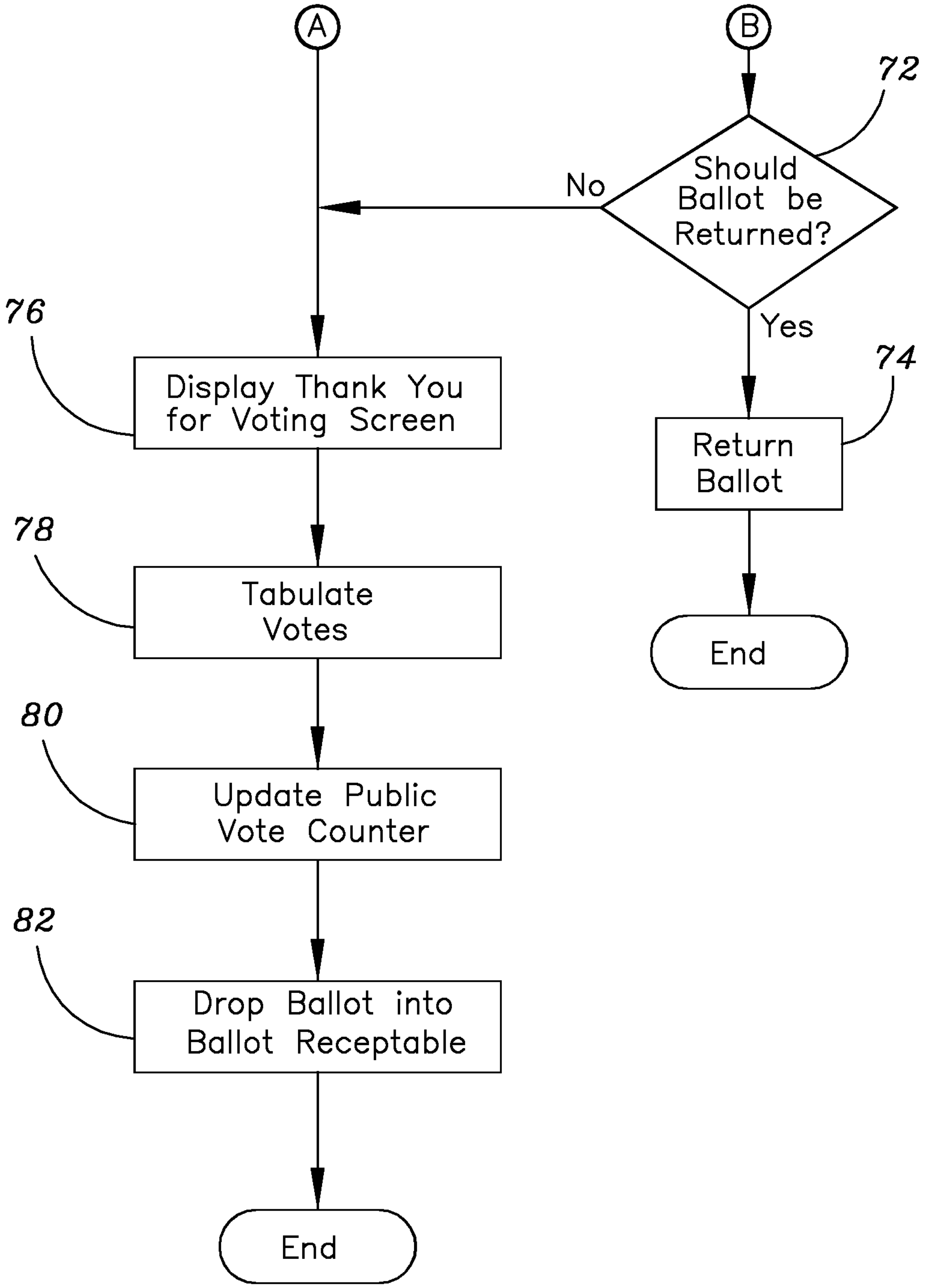

Referring to FIG. 4B, at block 72, a determination is made as to whether the paper ballot should be returned to the voter. It can be appreciated that this determination is made based upon whether the voter selects the "Don't Cast—Return Ballot" button or the "Cast Ballot" button described above, or, whether the error relates to the scanning of the ballot. If the voter selects the "Don't Cast—Return Ballot" button or if the error relates to the scanning of the ballot, the ballot is returned to the voter at block 74, preferably by feeding the ballot in the opposite direction through the ballot insertion tray 14. At this point, the voter may either correct the error on the same paper ballot or obtain a new ballot from a poll worker. If the voter selects the "Cast Ballot" button, the contests with irregularities (e.g., under-votes and/or over-votes) will not be included in the final tabulation while the remaining contests will be tabulated appropriately. It should be noted that the voting rules in some jurisdictions may prohibit casting ballots containing certain ballot irregularities (e.g., over voted ballots). In those jurisdictions, if one or more prohibited irregularities are detected, the "Cast Ballot" button will not be displayed as an option.

At block 76, upon casting the ballot, the ballot tabulation device 10 displays a "thank you for voting" screen on the display 16 informing the voter that his/her voting selections have been tabulated. The "thank you for voting" screen displays a short message (e.g., "Thank you for voting. Your ballot has been counted."). Preferably, the message will be displayed for approximately three seconds or until the next ballot is inserted into the ballot insertion tray 14.

Next, at block 78 in FIG. 4B, the votes are tabulated by CPU board 30 and stored in one of the removable USB flash drives of USB board 42 (noting, of course, that any contest with errors, such as under votes and/or over votes, are not tabulated as part of the election results but may be tracked as part of the tabulation statistics discussed below). Then, at block 80, the public and protected counts are incremented by one to thereby provide confirmation that the ballot has been tabulated. At block 82, the ballot is dropped into the secure ballot receptacle 24 where it is retained for audit purposes, as is known in the art.

In accordance with the present invention, ballot tabulation device 10 is operable to maintain health status information for the device that can be used to identify any irregularities associated with the device. As discussed further below, the health status information may comprise statistical ballot tabulation information, such as statistical information relating to one or more over votes, under votes or blank ballots processed by the device, the number of ballots cast on the device, and/or the number of ballots having a particular ballot style cast on the device. The health status information may also comprise operating condition information, such as the battery charge of the device, the AC or DC power status of the device, the modem signal strength of the device, and/or the internal temperature of the device. In addition, the health status information may comprise poll information, such as the open/closed poll status of the device, the poll opening timestamp for the device, and/or the poll closing timestamp for the device. Other examples of information that could be monitored will be apparent to one skilled in the art. The health status information may be stored in one of the removable USB flash drives of USB board 42 or other memory of the device, which may be accessed periodically throughout election day (as discussed below) or at a later time for audit purposes. Alternatively, the health status information need not be stored for later access and may be derived only upon user request, as described below.

In a first exemplary embodiment, ballot tabulation device 10 encodes the health status information in a machine-readable code that is displayed on display 16 of the device, as shown in FIG. 5B discussed below. In this embodiment, the machine-readable code comprises a two-dimensional data matrix barcode, such as a QR code, that encodes health status information for ballot tabulation device 10. Of course, one skilled in the art will understand that any type of machine-readable code may be used. The barcode may also encode information that identifies ballot tabulation device 10 so that the health status information can be associated with a particular ballot tabulation device when received at a central election office (discussed below).

In this embodiment, a poll worker enables or disables the display of the barcode on display 16 via the administration menu of ballot tabulation device 10. Turning to FIG. 5A, an exemplary screen shot of display 16 showing a "display status barcode" screen is provided. As can be seen, the screen is divided into two panels. The left panel provides a menu of administrative options for accessing various device functionality, including a "Status Barcode" option. Upon selecting the "Status Barcode" option, the right panel provides two options for setting the status of the barcode display via the radio buttons for "Enable" and "Disable." The poll worker then selects one of the two radio buttons so as to enable or disable the display of the barcode. Then, the poll worker can select the "Apply" button and the selection will be saved. Alternatively, the enable/disable status of the barcode display may be controlled with a flag setting via the EMS system (i.e., the system used to create the election definition files for the ballot tabulation devices in the jurisdiction).

If the barcode display status has been set to "Enable," a poll worker may periodically request display of the barcode via the administration menu of ballot tabulation device 10. Turning to FIG. 5B, an exemplary pop-up window that appears on the "welcome" screen of display 16 is provided. The pop-up window includes the public count information for ballots processed by the device (i.e., "DS200 Ballots"). In addition, the device may be configured to process cards printed by an accessible voting station, such as the ExpressVote® voting system sold by Election Systems & Software, LLC (i.e., "ExpressVote Cards"). The pop-up window further includes a barcode that encodes the health status information of ballot tabulation device 10. With the barcode displayed on display 16, a poll worker uses a reading device with a suitable software application to read the barcode from the display screen and transmit the health status information to the central election office. The reading device may be a smart phone, tablet computer, or any other monitoring device known in the art. Preferably, the reading device is a commercial off-the-shelf smart phone. Protocol may require that the poll worker transmit the health status information to the central election office at periodic time intervals (e.g., once every hour).

Preferably, the reading device captures an image of the barcode (e.g., using a camera on the reading device) and transmits the image to a central server located at the central election office over a suitable communication network. In this case, the central server would read and decode the health status information from the received image of the barcode using a suitable software application. Alternatively, the reading device may scan and decode the health status information from the barcode and transmit the decoded health status information to the central server over a suitable communication network. If the ballot tabulation device is located at a polling place with a poor transmission/reception zone, the reading device could store the data for later transmission to the central server when the reading device is transported to a better transmission/reception zone. In this case, data obtained at different times and/or from different tabulation devices could be stored and later transmitted to the central server.

Of course, one skilled in the art will understand that the barcode described above could alternatively be printed on a paper tape rather than displayed on display 16. For example, some ballot tabulation devices do not have a display screen. In this case, the report printer (similar to report printer 18 shown in FIG. 1) could print a paper tape that includes the barcode. The health status information encoded in the printed barcode could then be read by the reading device and transmitted to the central server as described above.

Alternatively, for jurisdictions that do not require a closed election system and allow for communication from ballot tabulation device 10 to other networks while the polls are open, the health status information (which may be encoded in a barcode) could be transmitted directly from ballot tabulation device 10 to a secure server at the central election office using the modem of the tabulation device. In this case, the barcode need not be displayed on display 16.

As another alternative, the health status information (which may be encoded in a barcode) could be transmitted from ballot tabulation device 10 to a specified device (e.g., a specified smart phone, tablet computer or other monitoring device known in the art) via a secure Bluetooth connection at periodic time intervals (e.g., once every hour). Of course, any other type of secure wireless connection known in the art could be used. Preferably, the specified device is programmed to automatically transmit the received information to the central server without any poll worker action. In this case, the barcode need not be displayed on display 16.

Thus, a central server located at the central election office may receive the health status information (which may be encoded in a barcode) from each of the ballot tabulation devices in different ways, including (1) receipt of health status information from a reading device; (2) receipt of health status information that is directly transmitted via the modem of the ballot tabulation device; or (3) receipt of health status information from a specified device with Bluetooth or other wireless capabilities (which automatically forwards all information received from the ballot tabulation device). Other means of transmitting the health status information to the central server are also within the scope of the present invention.

Using the received health status information, the central server generates one or more alerts that identify any irregularities associated with the ballot tabulation devices. In one embodiment, the central server generates a plurality of alerts each of which comprises a specific indication of an irregularity associated with one of the ballot tabulation devices. In another embodiment, the alert comprises a report (such as the reports shown in FIGS. 7 and 8 described below) that provides the health status information for all of the ballot tabulation devices in the jurisdiction. In cases where the health status information is transmitted from a reading device, the timing and frequency of these reports is dependent on the frequency at which the poll worker transmits the health status information. In cases where the tabulation statistics are transmitted directly from the ballot tabulation device, the timing and frequency of these reports could be set by an administrator during set-up of the election definition.

As discussed above, the central server compiles the health status information received from ballot tabulation device 10 and other tabulation devices in the jurisdiction so as to generate a report. An exemplary report shown on a monitoring screen at the central election office is shown in FIG. 7. This report identifies each ballot tabulation device by a precinct unit identification number. For each ballot tabulation device, the report includes information such as the time the health status information was sent (which provides a time stamp to create an audit trail), when the poll opened, when the poll closed, whether the unit is operating on AC power, battery status, total ballots cast, total ballots cast by ballot styles (i.e., BS #1, BS #2, BS #3, and BS #4), percent of over votes, percent of under votes, percent of blank ballots, system temperature, and signal strength of the modem. Access to this type of information allows an administrator to monitor the ballot tabulation devices across the jurisdiction and ensure they are operating normally.

For example, the number of over votes, under votes and blank ballots can indicate whether a ballot tabulation device is functioning properly. While a certain amount of over votes, under votes, and blank ballots are normal in any election, they are typically less than 1-5% of the overall votes. If this percentage exceeds an expected amount (e.g., wherein various warning levels may be preprogrammed into the central server), these percentages are color-coded or highlighted on the report, as shown in FIG. 7. Viewing information from across the jurisdiction will allow an administrator to compare one polling location to another and perhaps conclude that a particular contest in a particular district is susceptible to being over voted and that the warnings are not due to system malfunction.

As another example, polls are required to open and close at certain times on election day. This report provides information on when the polls opened and when the polls closed without phone calls from poll workers to confirm the same. An alert, such as the one shown in FIG. 7 for Precinct Unit ID#107380934 indicating that a particular poll is not open, can prompt an administrator to call the precinct and ask if there are problems with the open-poll protocol.

As another example, the report provides information on the number of ballots processed by ballot style. As such, an administrator can determine that a polling location is running low on a particular ballot style, which allows time for more ballots to be delivered to the polling location prior to running out. The number of ballots by ballot style delivered to a particular polling place could be preprogrammed such that when total ballots cast by ballot style approaches that number, the number is color-coded or otherwise highlighted on the report.

As yet another example, while ballot tabulation devices usually contain on board battery backup (as described above), they generally use AC power for their main power supply. An AC Power alert, such as the one shown in FIG. 7 for Precinct Unit ID #107380935, may indicate that the power is out or that the unit is plugged into a non-functional power outlet. Upon being alerted that a tabulation device is not running on AC power, the administrator can proactively contact the polling location and let a poll worker know that the device needs to be plugged into another outlet and/or to check the power connections on the device itself. Also, when several ballot tabulation devices in a common area are not running on AC power, it may indicate to an administrator that the main power has gone out, possibly from a local storm or other reasons. The jurisdiction can alert the local power authorities and have them immediately begin to restore the power in that area. The battery charge status is also important in the event that the power does go out. A battery alert, such as the one shown in FIG. 7 for Precinct Unit ID #107380936, may indicate that the battery charge status is low. Battery alerts allow an administrator to send a technician to the polling location to replace the battery or replace the tabulation device, which would prevent a disruption in the voting process if the power does go out.

As yet another example, modem signal strength must be strong enough to send the health status information discussed above and/or the final tally information at the end of election day. By monitoring this information, the election officials can be sure that at poll closing, the final tally information will be sent without issue. An alert, such as the one shown in FIG. 7 for Precinct Unit ID #107380938, is helpful in identifying this issue prior to the close of polls on election day. In a similar fashion, the temperature of the ballot tabulation device can be monitored if the device is equipped with a thermometer. A high temperature alert, such as the one provided for Precinct Unit ID #107380937, could indicate system malfunction and a technician can proactively be sent to correct the issue.

Finally, as shown in FIG. 8, the report has been updated with information as of 7:30 am and all of the alerts for the five ballot tabulation devices discussed above have been resolved. One skilled in the art will appreciate that monitoring health status information in this fashion allows for proactive problem solving with respect to the operation of the ballot tabulation devices and promotes confidence in the election day process.

In a second exemplary embodiment, ballot tabulation device 10 analyzes the health status information and generates one or more visual or audio alerts that identify any irregularities associated with the device, as shown in FIG. 6B discussed below. In this embodiment, the EMS system is used to set alert levels for the health status information of all of the ballot tabulation devices in the jurisdiction. For purposes of describing this embodiment, the health status information includes only tabulation statistics relating to the percentage of over votes, under votes and blank ballots processed by each ballot tabulation device. Of course, it should be understood that any of the health status information described above could be included. The EMS system is also used to configure the frequency at which tabulation statistic reports are to be sent from each ballot tabulation device to the central election office, as discussed below.

Turning to FIG. 6A, an exemplary screen shot of the EMS system's "configure equipment" screen is provided. As can be seen, the screen is divided into three panels. The left panel provides a menu of administrative options for accessing various system functionality, including a "Configure Equipment" icon. Upon selecting the "Configure Equipment" icon, an equipment list appears in the center panel of the screen. The precinct-based tabulation devices are identified as "DS200 Poll Places," and upon selecting this option, "Monitor Sending Options" are provided in the lower portion of the right panel. The "Monitor Sending Options" portion of the screen includes drop down boxes for selecting yellow and red warning levels for each of over votes, under votes, and blank ballots, a check box for "Send Statistical Reports from Precinct Tabulators" and options relating to the sending frequency of the statistical reports.

Using the drop down boxes, the administrator sets the desired yellow and red warning levels for each of the tabulation statistics. The options shown are percentages of the total ballots cast on the ballot tabulation device. One skilled in the art will understand that these options could instead be raw numbers or ratios and the manner in which the levels are set could be a text field for receiving a user entered number or a list of options associated with checkboxes from which the desired level is selected. As shown in FIG. 6A, the administrator has set the over vote yellow warning level at 5%, which means that the over vote indicator for a ballot tabulation device programmed with this level will be flagged as yellow when the percentage of ballots cast that include an over vote meets or exceeds 5% of the overall number of ballots cast on that device. As described in more detail below, a yellow indicator can be displayed on display 16 of ballot tabulation device 10 and/or appear in a report provided at the central election office (as shown in FIG. 7 and discussed above). Also as shown in FIG. 6A, the administrator has set the over vote red warning level at 7%, which means that the over vote indicator for a ballot tabulation device programmed with this level will be flagged as red when the percentage of ballots cast that include an over vote meets or exceeds 7% of the overall number of ballots cast on that device. The yellow and red warning levels for under vote and blank ballot statistics have been set in a similar fashion at 5% and 7% and at 3% and 5%, respectively.

Once the desired warning levels for the tabulation statistics are set, the administrator may have the option of checking the box associated with "Send Statistical Reports from Precinct Tabulators." This option is used in a system where connectivity between a ballot tabulation device and the EMS system (or other secure server at the central election office) is provided through a modem or other communication means on election day. If this box is checked, ballot tabulation device 10 will automatically communicate the tabulation statistics by sending tabulation statistic reports to the central election office. If automatic reports are desired, the frequency of the reports can be further configured. Under the "Sending Frequency" menu, the administrator has the option of having tabulation statistic reports sent upon poll opening and/or poll closing by checking the boxes corresponding to these options. In addition to these reporting options, the administrator may also request that reports be sent at timed intervals by selecting a specific number of minutes. Of course, one skilled in the art will understand that this option would only be available in jurisdictions that do not require a closed election system and allow for communication from the ballot tabulation device to other networks while the polls are open. After the "Monitor Sending Options" have been configured, the administrator can select the "Save" button and the options will be saved in conjunction with the election definition data for the ballot tabulation devices in the jurisdiction. Alternatively, if the administrator does not want to save the configuration or changes thereto, she can simply select the "Close" button to exit this screen.

Turning to FIG. 6B, an exemplary "welcome" screen of display 16 is shown that includes three tabulation statistic icons to the left of the header information (note that these icons do not appear in the exemplary "welcome" screen of FIG. 5B). The circular icons include one of "OV," "UV," and "BB," which correspond to over vote, under vote, and blank ballot, respectively. Preferably, the tabulation statistic icons are color-coded such that each icon appears green, yellow or red, as set forth in Table 1 below.

TABLE 1

| | |
|---|---|
| green | tabulation statistic value is below the predetermined yellow warning value |
| yellow | tabulation statistic value meets or exceeds the yellow warning value but is less than the predetermined red warning value |
| red | tabulation statistic value meets or exceeds the red warning value |

Alternatively, the icons need not be color-coded and other means could be used to indicate the status of the tabulation statistics and/or provide alerts to a poll worker. Also, the icons may not appear on the "welcome" screen until the tabulation statistic value exceeds the lowest warning value (e.g., the yellow warning value).

In this embodiment, a poll worker periodically monitors the ballot tabulation device 10. Monitoring may consist of physically walking by the tabulation device and looking at the "welcome" screen. Alternatively, monitoring may involve the use of a handheld device in communication with the tabulation device. The handheld device preferably includes a display screen capable of visually indicating to the poll worker when a warning level has been reached, and may also provide an audible alert. For example, the tabulation statistic indicators could appear on the handheld device instead of or in addition to appearing on the "welcome" screen of the tabulation device. When a poll worker is alerted that a tabulation statistic indicator has appeared or changed color from green to yellow (or yellow to red), protocol may require her to call the central election office to alert an administrator of the change in status. The central election office may send a technician to service the tabulation device to ensure it is functioning properly. If an indicator has turned red, protocol may require the technician to replace the tabulation device. Of course. these protocols will vary from jurisdiction to jurisdiction.

While certain embodiments of the present invention have been described above in connection with the transmission of health status information to a central server, one skilled in the art will appreciate that other types of information could also be transmitted to the central election office in a similar manner. For example, the reading device could be used to scan a barcode that encodes the voting results for the ballot tabulation device, wherein the barcode could be displayed on display 16 or printed on a paper tape as described above. In this case, the voting results could be transmitted to the EMS system (or other secure server at the central election office) via the reading device, rather than using the modem or other communication means provided on the ballot tabulation device.

As another example, the reading device could be used to scan and check in equipment and/or supplies (e.g., a package of shrink wrapped pre-printed ballots, a box of supplies, etc.) that do not have a display screen, but do have a barcode label that can be read by the reading device. In this case, the reading device could scan the barcode, supplement the scanned information with other application/user data, and transmit such information to the central server.

Thus, while the present invention has been described and illustrated hereinabove with reference to several exemplary embodiments, it should be understood that various modifications could be made to these embodiments without departing from the scope of the invention. Therefore, the present invention is not to be limited to the specific configuration and methodology of the exemplary embodiments, except insofar as such limitations are included in the following claims.

What is claimed and desired to be secured by Letters Patent is as follows:

1. A system for remotely monitoring a plurality of ballot tabulation devices across a jurisdiction, comprising:

- a plurality of ballot tabulation devices located at a plurality of polling locations for the jurisdiction, wherein each ballot tabulation device comprises:
  - a scanner assembly operable to scan at least a portion of a paper ballot with one or more marked voting selections to capture an image of the paper ballot;
  - a processing circuit programmed to analyze the image of the paper ballot so as to decode and tabulate the marked voting selections, wherein the processing circuit is also programmed to generate and maintain health status information that provides an indication of any irregularities associated with operation of the ballot tabulation device and encode the health status information in a machine-readable code;
  - a display screen operable to display the machine-readable code;
- a reading device associated with each polling location and operable to read the machine-readable code from the display screen of at least one ballot tabulation device located at the polling location and transmit the health status information over a communication network to a central election office for the jurisdiction; and
- a central server located at the central election office for the jurisdiction remote from the ballot tabulation devices and each reading device at each polling location, wherein the central server is operable to periodically receive the health status information for each ballot tabulation device from each reading device and is programmed to generate an alert that identifies any irregularities associated with operation of the ballot tabulation device based on the received health status information.

2. The system of claim 1, wherein the health status information for each ballot tabulation device comprises statistical ballot tabulation information that enables a determination of one or more of the following: a percentage of over votes processed by the ballot tabulation device, a percentage of under votes processed by the ballot tabulation device, and a percentage of blank ballots processed by the ballot tabulation device.

3. The system of claim 1, wherein the health status information for each ballot tabulation device comprises operating condition information on one or more of the following: a battery charge of the ballot tabulation device, an AC or DC power status of the ballot tabulation device, a modem signal strength of the ballot tabulation device, and an internal temperature of the ballot tabulation device.

4. The system of claim 1, wherein the health status information for each ballot tabulation device comprises poll information on one or more of the following: a poll status of the ballot tabulation device, a poll opening timestamp for the ballot tabulation device, and a poll closing timestamp for the ballot tabulation device.

5. The system of claim 1, wherein the machine-readable code also encodes information that identifies the ballot tabulation device.

6. The system of claim 1, wherein the machine-readable code comprises a barcode.

7. A system for remotely monitoring a plurality of ballot tabulation devices across a jurisdiction, comprising:

- a plurality of ballot tabulation devices located at a plurality of polling locations for the jurisdiction, wherein each ballot tabulation device comprises:
  - a scanner assembly operable to scan at least a portion of a paper ballot with one or more marked voting selections to capture an image of the paper ballot;
  - a processing circuit programmed to analyze the image of the paper ballot so as to decode and tabulate the marked voting selections, wherein the processing circuit is also programmed to generate and maintain health status information on the ballot tabulation device, wherein the health status information provides an indication of any irregularities associated with operation of the ballot tabulation device and comprises one or more of:

(a) statistical ballot tabulation information that enables a determination of one or more of the following: a percentage of over votes processed by the ballot tabulation device, a percentage of under votes processed by the ballot tabulation device, and a percentage of blank ballots processed by the ballot tabulation device;

(b) operating condition information on one or more of the following: a battery charge of the ballot tabulation device, an AC or DC power status of the ballot tabulation device, a modem signal strength of the ballot tabulation device, and an internal temperature of the ballot tabulation device;

(c) poll information on one or more of the following: a poll status of the ballot tabulation device, a poll opening timestamp for the ballot tabulation device, and a poll closing timestamp for the ballot tabulation device;

a central server located at a central election office for the jurisdiction remote from the ballot tabulation devices at the polling locations, wherein the central server is operable to periodically receive the health status information for each ballot tabulation device as transmitted over a communication network and is programmed to generate an alert that identifies any irregularities associated with operation of the ballot tabulation device based on the received health status information.

8. The system of claim 7, wherein the processing circuit of each ballot tabulation device is also programmed to encode the health status information in a machine-readable code, and wherein each ballot tabulation device further comprises a display screen operable to display the machine-readable code.

9. The system of claim 7, wherein each ballot tabulation device further comprises a display screen operable to display one or more visual alerts that identify any irregularities associated with operation of the ballot tabulation device.

10. The system of claim 7, wherein each ballot tabulation device further comprises a modem operable to transmit the health status information to the remote central server over the communication network.

* * * * *

UNITED STATES PATENT AND TRADEMARK OFFICE

CERTIFICATE OF CORRECTION

PATENT NO. : 8,944,326 B2
APPLICATION NO. : 14/142237
DATED : February 3, 2015
INVENTOR(S) : Steve Bolton et al.

It is certified that error appears in the above-identified patent and that said Letters Patent is hereby corrected as shown below:

<u>Title Page</u>,

Item 73, Assignee
Line 11, on the Title page of the Patent, delete “Electron” and insert -- Election -- therefor.

Signed and Sealed this
Sixteenth Day of June, 2015

Michelle K. Lee
*Director of the United States Patent and Trademark Office*